United States Patent
Hanagami et al.

(10) Patent No.: US 10,449,766 B2
(45) Date of Patent: Oct. 22, 2019

(54) MANUFACTURING METHOD OF FLOW PATH MEMBER, FLOW PATH MEMBER, LIQUID DISCHARGING HEAD, AND LIQUID DISCHARGING APPARATUS

(71) Applicant: SEIKO EPSON CORPORATION, Tokyo (JP)

(72) Inventors: Taiki Hanagami, Matsumoto (JP); Fujio Akahane, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/670,850

(22) Filed: Aug. 7, 2017

(65) Prior Publication Data
US 2018/0079213 A1 Mar. 22, 2018

(30) Foreign Application Priority Data
Sep. 21, 2016 (JP) .................................. 2016-183927

(51) Int. Cl.
| | |
|---|---|
| *B41J 2/16* | (2006.01) |
| *B23K 20/10* | (2006.01) |
| *B41J 2/14* | (2006.01) |
| *B41J 2/175* | (2006.01) |

(52) U.S. Cl.
CPC ............ *B41J 2/1632* (2013.01); *B23K 20/10* (2013.01); *B41J 2/1433* (2013.01); *B41J 2/16* (2013.01); *B41J 2/162* (2013.01); *B41J 2/1623* (2013.01); *B41J 2/1634* (2013.01); *B41J 2/1637* (2013.01); *B41J 2/175* (2013.01)

(58) Field of Classification Search
CPC ........ B41J 2/1632; B41J 2/175; B41J 2/1637; B41J 2/1634; B41J 2/1623; B41J 2/1433; B41J 2/162; B41J 2/16; B23K 20/10
See application file for complete search history.

(56) References Cited

U.S. PATENT DOCUMENTS

| | | | |
|---|---|---|---|
| 6,634,742 B2 * | 10/2003 | Owaki | B41J 2/17513 347/87 |
| 6,974,207 B2 | 12/2005 | Drummond et al. | |
| 7,354,137 B2 | 4/2008 | Drummond et al. | |
| 2009/0152326 A1 * | 6/2009 | Shin | B29C 66/114 228/110.1 |
| 2012/0293588 A1 * | 11/2012 | Shimamura | B29C 65/08 347/84 |

(Continued)

FOREIGN PATENT DOCUMENTS

| | | |
|---|---|---|
| JP | 2007-210165 | 8/2007 |
| JP | 2015-174391 | 10/2015 |

(Continued)

*Primary Examiner* — Yaovi M Ameh
(74) *Attorney, Agent, or Firm* — Workman Nydegger

(57) ABSTRACT

A manufacturing method of a flow path member which includes a flow path between first and second members which are stacked together includes a first step of welding the first and second members to each other at a first welding portion in a state in which a pressure is applied in a stacking direction to the first and second members which are stacked to be in contact with each other, and a second step of welding the first and second members to each other in a state in which a greater pressure is applied in the stacking direction to the first and second members at a second welding portion of a different position from the first welding portion.

11 Claims, 14 Drawing Sheets

(56) References Cited

U.S. PATENT DOCUMENTS

2015/0192446 A1 7/2015 Arai et al.
2015/0258786 A1 9/2015 Akahane et al.
2016/0114592 A1 4/2016 Ishii et al.

FOREIGN PATENT DOCUMENTS

JP 2016-83927 5/2016
WO 2013-186926 12/2013

* cited by examiner

MANUFACTURING METHOD OF FLOW PATH MEMBER, FLOW PATH MEMBER, LIQUID DISCHARGING HEAD, AND LIQUID DISCHARGING APPARATUS

BACKGROUND

1. Technical Field

The present invention relates to a manufacturing method of a flow path member in which a liquid which is discharged from a liquid discharging head such as an ink jet recording head flows, a flow path member, a liquid discharging head, and a liquid discharging apparatus.

2. Related Art

A liquid discharging apparatus is an apparatus which is provided with a liquid discharging head and which discharges (ejects) various liquids. An image recording apparatus such as an ink jet printer or an ink jet plotter is an example of the liquid discharging apparatus; however, recently liquid discharging apparatuses are also being adapted for use in various manufacturing apparatuses, making use of the characteristic of being capable of causing extremely small amounts of a liquid to accurately land on predetermined positions. For example, the liquid discharging apparatuses are being adapted for use in display manufacturing apparatuses which manufacture color filters of liquid crystal displays and the like, electrode forming apparatuses which form electrodes of organic electroluminescence (EL) displays, field emission displays (FED), and the like, and chip manufacturing apparatuses which manufacture biochips (biochemical elements). In a recording head for an image recording apparatus, a liquid-state ink is discharged, and in a color material discharging head for a display manufacturing apparatus, solutions of color materials for each of red (R), green (G), and blue (B) are discharged. In an electrode material discharging head for an electrode forming apparatus, a liquid-state electrode material is discharged, and in a bio-organic matter discharging head for a chip manufacturing apparatus, a solution of bio-organic matter is discharged.

In the liquid discharging apparatuses which are described above, in order to supply a liquid to the liquid discharging head, to supply a gas for adjusting the pressure of the liquid inside the flow path, and the like, there is a liquid discharging apparatus which is provided with a flow path member in which flow paths in which the fluids flow are formed. For example, in a flow path member (a flow path structure) which is disclosed in JP-A-2015-174391, a plurality of flow paths are formed in an inner portion of the flow path member by bonding a first member and a second member, which are made of synthetic resin and are plate-shaped, to each other in a stacked state. For the bonding of these substrates, in addition to adhesion using an adhesive, for example, thermal welding which uses a laser, ultrasonic wave welding using ultrasonic waves, and the like are favorably used.

Incidentally, when molding components made of resin such as the first member and the second member which configure the flow path member which is described above, so-called sink marks in which the surface is partially depressed arise, particularly at the center portion and portions which are thicker than the other portions of the product. In the portions in which the sink marks arise in the bonding surfaces between components, there is a case in which the adherence properties of the components made of resin are insufficient and the bonding is insufficient. In other words, there is a case in which non-bonding portions arise in the bonding surfaces. For example, in a case in which sink marks arise in the bonding portions of the edge which defines the liquid flow path, there is a problem in that problems arise such as the liquid leaking from the portions in which the bonding is insufficient.

SUMMARY

An advantage of some aspects of the invention is to provide a manufacturing method of a flow path member which is capable of reducing problems caused by non-bonding portions which are caused by sink marks or the like, a flow path member, a liquid discharging head, and a liquid discharging apparatus.

According to an aspect of the invention, there is provided a manufacturing method of a flow path member which includes a flow path between a first member and a second member which are stacked together which includes a first step of welding the first member and the second member to each other at a first welding portion in a state in which pressure is applied in a stacking direction to the first member and the second member which are stacked to be in contact with each other, and a second step of welding the first member and the second member to each other at a second welding portion of a different position from the first welding portion in a state in which a pressure is applied in the stacking direction to the first member and the second member, in which in the second step, the pressure which is applied to the second welding portion is greater than the pressure which is applied to the second welding portion in the first step.

According to the aspect of the invention, since the pressure which is applied to the second welding portion in the second step is greater than the pressure which is applied to the first welding portion and the second welding portion at the beginning of the first step, it is possible to more reliably weld the first member and the second member at the second welding portion. Therefore, for example, even in a case in which non-bonding portions (sink marks) are present in one of the members in the vicinity of the second welding portion, the flow path which is defined by the first member and the second member is partitioned and formed in a more reliably sealed state (a state in which liquid-tightness or gas-tightness is secured). As a result, problems such as liquid leaking and air leaking in the flow paths are reduced.

In the method, in the first step, the pressure which is applied to the second welding portion may increase as the pressure which is applied to the first welding portion decreases in a state in which a shape of a main body of the first member and a shape of a main body of the second member are maintained.

According to this method, since the first member and the second member are bonded in a state in which the pressure which is applied to the second welding portion is increased while the shape of the main body of the first member and the shape of the main body of the second member are maintained, it is possible to weld both the members while reducing the relative positional deviation between the first member and the second member.

In the method, in the first step, by welding the first member and the second member at the first welding portion, at least one of the first member or the second member may be set to a warped state, and in the second step, by welding the first member and the second member at the second welding portion, the warping of the one may be reduced.

According to this method, a jig which maintains the shape of the main body of the first member and the shape of the main body of the second member is unnecessary and it is possible to simplify the manufacturing apparatus.

In the method, it is preferable that the first member include a thick portion and a thin portion, and that a distance between the second welding portion and the thick portion be shorter than a distance between the first welding portion and the thick portion.

According to this method, it is possible to more reliably weld the first member and the second member at the second welding portion of a position which is closer to the thick portion at which the non-bonding portions arise easily. Therefore, even in a case in which the non-bonding portions are present in the thick portion, the flow path which is defined by the first member and the second member is partitioned and formed in a more reliably sealed state. It is more preferable that the welding be made more reliable by setting the minimum distance between the second welding portion and the thick portion shorter than the minimum distance between the first welding portion and the thick portion.

In the method, it is preferable that the thick portion and the thin portion be arranged along a first direction in the first member, and that the first welding portion and the second welding portion be arranged along the first direction in the first member.

According to this method, since the direction in which the thick portion and the thin portion are lined up is aligned with the direction in which the first welding portions and the second welding portions are lined up, the order in which the welding of the portions in which the non-bonding portions arise easily and the welding of the welding portions are to be performed becomes clear and the welding step becomes simple. It is easy to change the distance between the thick portion and the first welding portion according to the distance between the thick portion at which the non-bonding portions arise easily and the second welding portion. For example, it is easy to render the distance between the second welding portion and the thick portion shorter than the distance between the first welding portion and the thick portion.

In the method, it is preferable that the first member include a joint which communicates with the flow path in a state in which the joint protrudes from one surface of the first member, and that the second welding portion be closer to the joint than the first welding portion.

According to this method, it is possible to more reliably weld the first member and the second member at the second welding portion of a position which is closer to the joint at which the non-bonding portions arise easily. Therefore, even in a case in which the non-bonding portions are present in the vicinity of the joint, the flow path which is defined by the first member and the second member is partitioned and formed in a more reliably sealed state. It is more preferable that the welding be made more reliable by setting the minimum distance between the second welding portion and the joint shorter than the minimum distance between the first welding portion and the joint.

In the method, it is preferable that a plurality of the joints be arranged along a first direction in the first member, and that the first welding portion and the second welding portion be arranged along the first direction in the first member.

According to this method, since the direction in which a plurality of the joints are lined up is aligned with the direction in which the first welding portion and the second welding portion are lined up, the order in which the welding of the portions in which the non-bonding portions arise easily and the welding of the welding portions are to be performed becomes clear and the welding step becomes simple. It is easy to change the distance between the joint of the center and the first welding portion according to the distance between the joint of the center (or the center of a plurality of the joints) at which the non-bending portions arise easily and the second welding portion. For example, it is easy to render the distance between the second welding portion and the joint of the center shorter than the distance between the first welding portion and the joint of the center.

In the method, it is preferable that a plurality of the first welding portions be provided at positions interposing the second welding portion therebetween.

According to this method, it is possible to more reliably weld the first member and the second member at the second welding portion of a position which is closer to the center portion of the member at which the non-bonding portions arise easily. Therefore, even in a case in which the non-bonding portions are present in the center portion of the member, the flow path which is defined by the first member and the second member is partitioned and formed in a more reliably sealed state. Since the second welding portion is interposed between a plurality of the first welding portions, the force acting on the second welding portion in accordance with the welding of the plurality of first welding portions increases. Therefore, it is possible to more reliably weld the first member and the second member at the second welding portion.

In the method, it is preferable to further include a housing portion which houses a fixing member relating to fixing of the flow path member, and that the second welding portion is closer to the housing portion than the first welding portion.

According to this method, it is possible to more reliably weld the first member and the second member at the second welding portion of a position which is closer to the housing portion of the fixing member at which the non-bonding portions arise easily. Therefore, even in a case in which the non-bonding portions are present in the vicinity of the housing portion, the flow path which is defined by the first member and the second member is partitioned and formed in a more reliably sealed state. It is more preferable that the welding be made more reliable by setting the minimum distance between the second welding portion and the housing portion shorter than the minimum distance between the first welding portion and the housing portion.

In the method, it is preferable that the housing portion and a portion which does not include the housing portion be arranged along a first direction in the first member, and that the first welding portion and the second welding portion be arranged along the first direction in the first member.

According to this method, since the direction in which the housing portion and the portion which does not include the housing portion are lined up is aligned with the direction in which the first welding portion and the second welding portion are lined up, the order in which the welding of the portions in which the non-bonding portions arise easily and the welding of the welding portions are to be performed becomes clear and the welding step becomes simple. It is easy to change the distance between the housing portion and the first welding portion according to the distance between the housing portion at which the non-bonding portions arise easily and the second welding portion. For example, it is easy to render the distance between the second welding portion and the housing portion shorter than the distance between the first welding portion and the housing portion.

In the method, it is preferable that the first welding portion be formed to surround a periphery of the second welding portion.

According to this method, due to the first welding portion being formed to surround the periphery of the second welding portion, even in an unlikely case in which liquid leaking or the like occurs from the flow path, the liquid which is leaked out is prevented from leaking out to the outside by the first welding portion.

In the method, it is preferable that, in a stacking direction of the first member and the second member, a thickness of a portion which defines the flow path extending along to a plane that is perpendicular to the stacking direction in the second member be thinner than a thickness of a portion which defines the flow path extending along to the plane of the first member.

According to this method, since it is possible to focus the portions at which the non-bonding portions arise easily on the first member which is relatively thick, it is clearer as to which positions to provide the first welding portions and the second welding portions and the layout of the welding portion and the flow path is simple.

According to another aspect of the invention, there is provided a flow path member which includes a first member which includes a thick portion and a thin portion, a second member which is stacked on the first member, a flow path which is defined by the first member and the second member, and a welding portion at which the first member and the second member are welded, in which the welding portion includes a first welding portion which is a relatively long distance from the thick portion and a second welding portion which is a relatively short distance from the thick portion, and in which an overhang amount of the second welding portion is greater than an overhang amount of the first welding portion.

According to this configuration, since the overhang amount of the second welding portion into the flow path or the like is greater than the overhang amount of the first welding portion into the flow path or the like, this indicates that the pressure which is applied during the welding of the second welding portion is greater than the force which is applied during the welding of the first welding portion. Accordingly, the first member and the second member are more reliably welded at the second welding portion. Therefore, for example, even in a case in which non-bonding portions are present in the thick portion before the welding, the flow path which is defined by the first member and the second member is partitioned and formed in a more reliably sealed state (a state in which liquid-tightness or gas-tightness is secured). As a result, problems such as liquid leaking and air leaking in the flow paths are reduced.

In the configuration described above, it is preferable that the thick portion and the thin portion be arranged along a first direction in the first member, and that the first welding portion and the second welding portion be arranged along the first direction in the first member.

According to this configuration, since the direction in which the thick portion and the thin portion are lined up is aligned with the direction in which the first welding portions and the second welding portions are lined up, the order in which the welding of the portions in which the non-bonding portions arise easily and the welding of the welding portions are to be performed becomes clear and the welding step becomes simple. It is easy to change the distance between the thick portion and the first welding portion according to the distance between the thick portion at which the non-bonding portions arise easily and the second welding portion. For example, it is easy to render the distance between the second welding portion and the thick portion shorter than the distance between the first welding portion and the thick portion.

According to still another aspect of the invention, there is provided a flow path member which includes a first member, a second member which is stacked on the first member, a flow path which is defined by the first member and the second member, and a welding portion at which the first member and the second member are welded, in which the first member includes a joint which communicates with the flow path in a state in which the joint protrudes from one surface, in which the welding portion includes a first welding portion which is a relatively long distance from the joint and a second welding portion which is a relatively short distance from the joint, and in which an overhang amount of the second welding portion is greater than an overhang amount of the first welding portion.

According to this configuration, since the overhang amount of the second welding portion into the flow path or the like is greater than the overhang amount of the first welding portion into the flow path or the like, this indicates that the pressure which is applied during the welding of the second welding portion is greater than the force which is applied during the welding of the first welding portion. Accordingly, the first member and the second member are more reliably welded at the second welding portion. Therefore, for example, even in a case in which non-bonding portions are present in the vicinity of the joint before the welding, the flow path which is defined by the first member and the second member is partitioned and formed in a more reliably sealed state (a state in which liquid-tightness or gas-tightness is secured). As a result, problems such as liquid leaking and air leaking in the flow paths are reduced.

In this configuration, it is preferable that a plurality of the joints be arranged along a first direction in the first member, and that the first welding portion and the second welding portion be arranged along the first direction in the first member.

According to this configuration, since the direction in which a plurality of the joints are lined up is aligned with the direction in which the first welding portion and the second welding portion are lined up, the order in which the welding of the portions in which the non-bonding portions arise easily and the welding of the welding portions are to be performed becomes clear and the welding step becomes simple. It is easy to change the distance between the joint of the center and the first welding portion according to the distance between the joint of the center (or the center of a plurality of the joints) at which the non-bonding portions arise easily and the second welding portion. For example, it is easy to render the distance between the second welding portion and the joint of the center shorter than the distance between the first welding portion and the joint of the center.

According to still another aspect of the invention, there is provided a flow path member which includes a first member, a second member which is stacked on the first member, a flow path which is defined by the first member and the second member, and a welding portion at which the first member and the second member are welded, in which in the first member, the welding portion includes a plurality of first welding portions and a second welding portion which is positioned between the plurality of first welding portions, in which an overhang amount of the second welding portion is greater than an overhang amount of the first welding portions.

According to this configuration, since the overhang amount of the second welding portion into the flow path or the like is greater than the overhang amount of the first welding portion into the flow path or the like, this indicates that the pressure which is applied during the welding of the second welding portion is greater than the force which is applied during the welding of the first welding portion. Accordingly, the first member and the second member are more reliably welded at the second welding portion. Therefore, for example, even in a case in which non-bonding portions are present in the center portion of the first member or the second member before the welding, the flow path which is defined by the first member and the second member is partitioned and formed in a more reliably sealed state (a state in which liquid-tightness or gas-tightness is secured). As a result, problems such as liquid leaking and air leaking in the flow paths are reduced.

According to still another aspect of the invention, there is provided a flow path member which includes a first member which includes a housing portion which houses a fixing member relating to fixing of the flow path member, a second member which is stacked on the first member, a flow path which is defined by the first member and the second member, and a welding portion at which the first member and the second member are welded, in which the welding portion includes a first welding portion which is a relatively long distance from the housing portion and a second welding portion which is a relatively short distance from the housing portion, and in which an overhang amount of the second welding portion is greater than an overhang amount of the first welding portion.

According to this configuration, since the overhang amount of the second welding portion into the flow path or the like is greater than the overhang amount of the first welding portion into the flow path or the like, this indicates that the pressure which is applied during the welding of the second welding portion is greater than the force which is applied during the welding of the first welding portion. Accordingly, the first member and the second member are more reliably welded at the second welding portion. Therefore, for example, even in a case in which non-bonding portions are present in the vicinity of the housing portion before the welding, the flow path which is defined by the first member and the second member is partitioned and formed in a more reliably sealed state (a state in which liquid-tightness or gas-tightness is secured). As a result, problems such as liquid leaking and air leaking in the flow paths are reduced. The occurrence of a problem in which the liquid inside the flow path leaks out to the housing portion side and flows to the outside is reduced.

In the configuration, it is preferable that the housing portion and a portion which does not include the housing portion be arranged along a first direction in the first member, and that the first welding portion and the second welding portion be arranged along the first direction in the first member.

According to this configuration, since the direction in which the housing portion and the portion which does not include the housing portion are lined up is aligned with the direction in which the first welding portion and the second welding portion are lined up, the order in which the welding of the portions in which the non-bonding portions arise easily and the welding of the welding portions are to be performed becomes clear and the welding step becomes simple. It is easy to change the distance between the housing portion and the first welding portion according to the distance between the housing portion at which the non-bonding portions arise easily and the second welding portion. For example, it is easy to render the distance between the second welding portion and the housing portion shorter than the distance between the first welding portion and the housing portion.

In this configuration, it is preferable that the first welding portion be formed to surround a periphery of the second welding portion.

According to this configuration, due to the first welding portion being formed to surround the periphery of the second welding portion, even in an unlikely case in which liquid leaking or the like occurs from the flow path, the liquid which is leaked out is prevented from leaking out to the outside by the first welding portion.

In the method, it is preferable that, in a stacking direction of the first member and the second member, a thickness of a portion which defines the flow path extending along to a plane that is perpendicular to the stacking direction in the second member be thinner than a thickness of a portion which defines the flow path extending along to the plane of the first member.

According to this configuration, since it is possible to focus the portions at which the non-bonding portions arise easily on the first member which is relatively thick, it is clearer as to which positions to provide the first welding portions and the second welding portions and the layout of the welding portion and the flow path is simple.

According to still another aspect of the invention, there is provided a liquid discharging head to which a liquid is introduced from the flow path member of any one of the configurations described above and which discharges the introduced liquid from a nozzle.

According to the invention, there is little concern of liquid leaking or air leaking in the flow path and reliability is improved.

According to still another aspect of the invention, there is provided a liquid discharging apparatus which includes the liquid discharging head of the configuration described above.

According to the invention, there is little concern of liquid leaking or air leaking in the flow path and reliability is improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a description will be given of embodiments of the invention with reference to the attached drawings. In the embodiments described hereinafter, there are various limits to favorable embodiments of the invention; however, the scope of the invention is not limited thereto as long as there is no wording particularly limiting the invention in the description hereinafter. Hereinafter, an ink jet printer 1 (a kind of liquid discharging apparatus, hereinafter simply referred to as a printer) in which a flow path member 13 which supplies an ink and air to an ink jet recording head (hereinafter, a recording head) 3 which is a kind of liquid discharging head is installed is exemplified.

Figure 1:
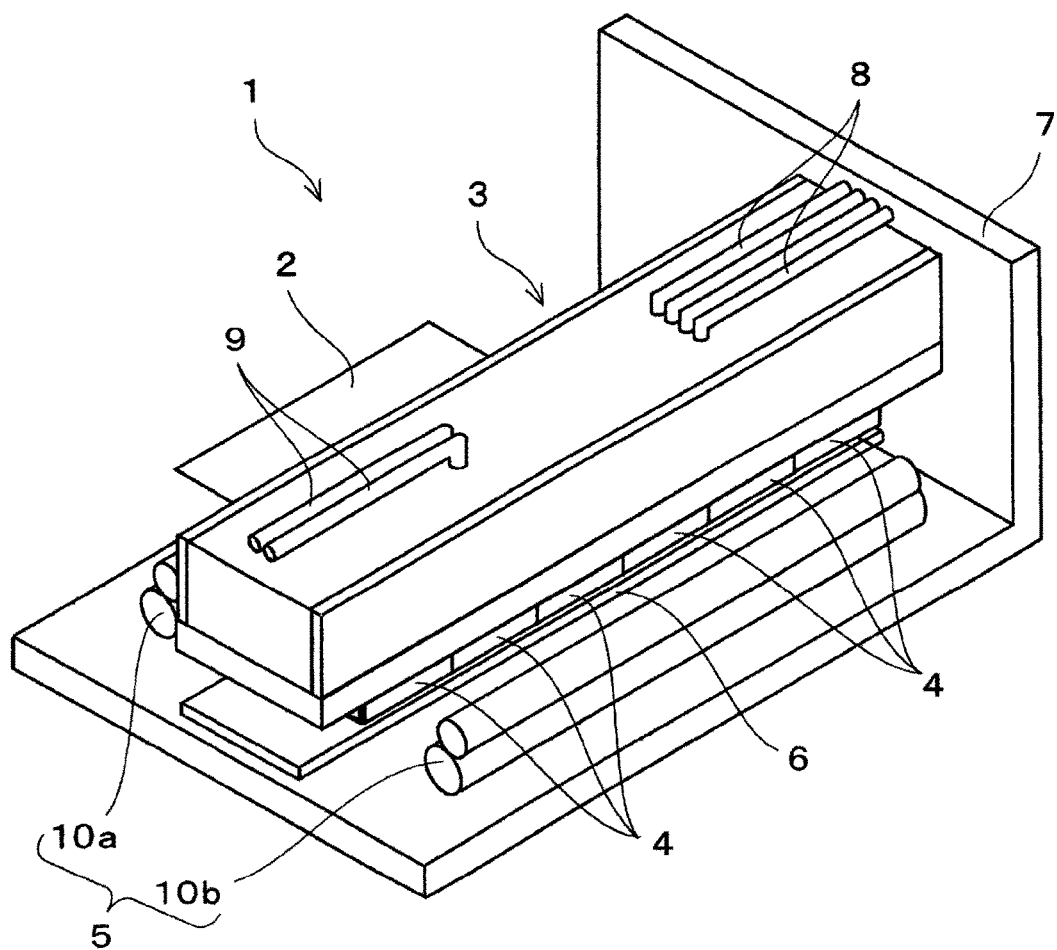
FIG. 1 is a perspective view illustrating the internal configuration of a printer.

A description will be given of the configuration of the printer 1 with reference to FIG. 1. The printer 1 is an apparatus which performs recording of an image or the like by discharging a liquid-state ink onto the surface of a recording medium 2 such as recording paper. The printer 1 is provided with the recording head 3, a transport mechanism 5, a medium support unit 6 (also referred to as a platen), and the like in the inner portion of an apparatus main body 7. The recording head 3 is provided with a plurality of head units 4, the transport mechanism 5 transports the recording medium 2, and the medium support unit 6 supports the recording medium 2 which is transported to a position facing the nozzle surfaces of the head units 4.

The recording head 3 in the present embodiment is a line head which is long in a direction (a second direction) which intersects (in the present embodiment, orthogonally intersects) a transport direction (a first direction) of the recording medium 2. The recording head 3 is connected to liquid supply tubes 8 which communicate with the inner portion of an ink cartridge (not illustrated) which stores an ink which is a kind of the liquid. The ink from the ink cartridge is supplied to the flow path member 13 (described later) of the recording head 3 via the liquid supply tubes 8. It is possible to adopt a configuration in which the ink cartridge is mounted on the recording head. Gas supply tubes 9 which supply a gas (in the present embodiment, air) to recording heads using a pump (not illustrated) are connected to the flow path member 13 of the recording head 3. Although not illustrated in the drawings, a wiring member such as an FFC which supplies drive signals and the like from a control unit is also connected to the recording head 3.

The transport mechanism 5 is provided with a first transport roller 10a and a second transport roller 10b. The first transport roller 10a is arranged in a top-bottom pair closer to the upstream side than the medium support unit 6 in the first direction, and the second transport roller 10b is arranged in a top-bottom pair closer to the downstream side than the medium support unit 6 in the transport direction. The recording medium 2 from the supply side is transported through the driving of the transport rollers 10a and 10b to pass over the medium support unit 6 toward the discharge side in a state of being pinched by the top-bottom rollers. The transport mechanism is configured using an endless belt, a drum, and the like, and in this configuration, the belt and the drum function as the medium support unit. For the medium support unit, it is also possible to adopt a medium support unit which is configured to adhere to the recording medium using an electrostatic force, or a medium support unit which is configured to attach to the recording medium by causing a suction pump or the like to generate a negative pressure.

Figure 2:
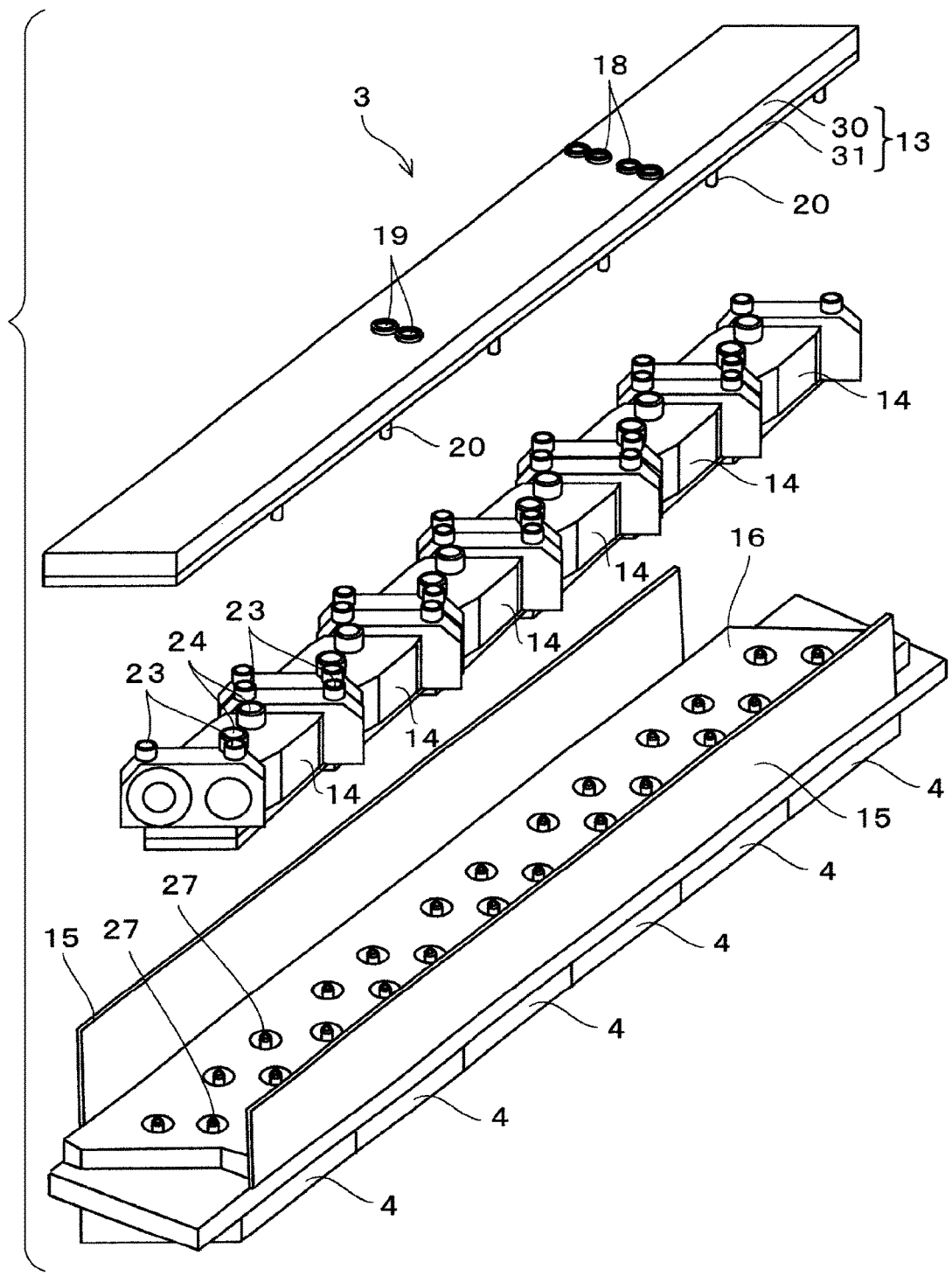
FIG. 2 is an exploded perspective view of a recording head as viewed from diagonally above.
Figure 3:
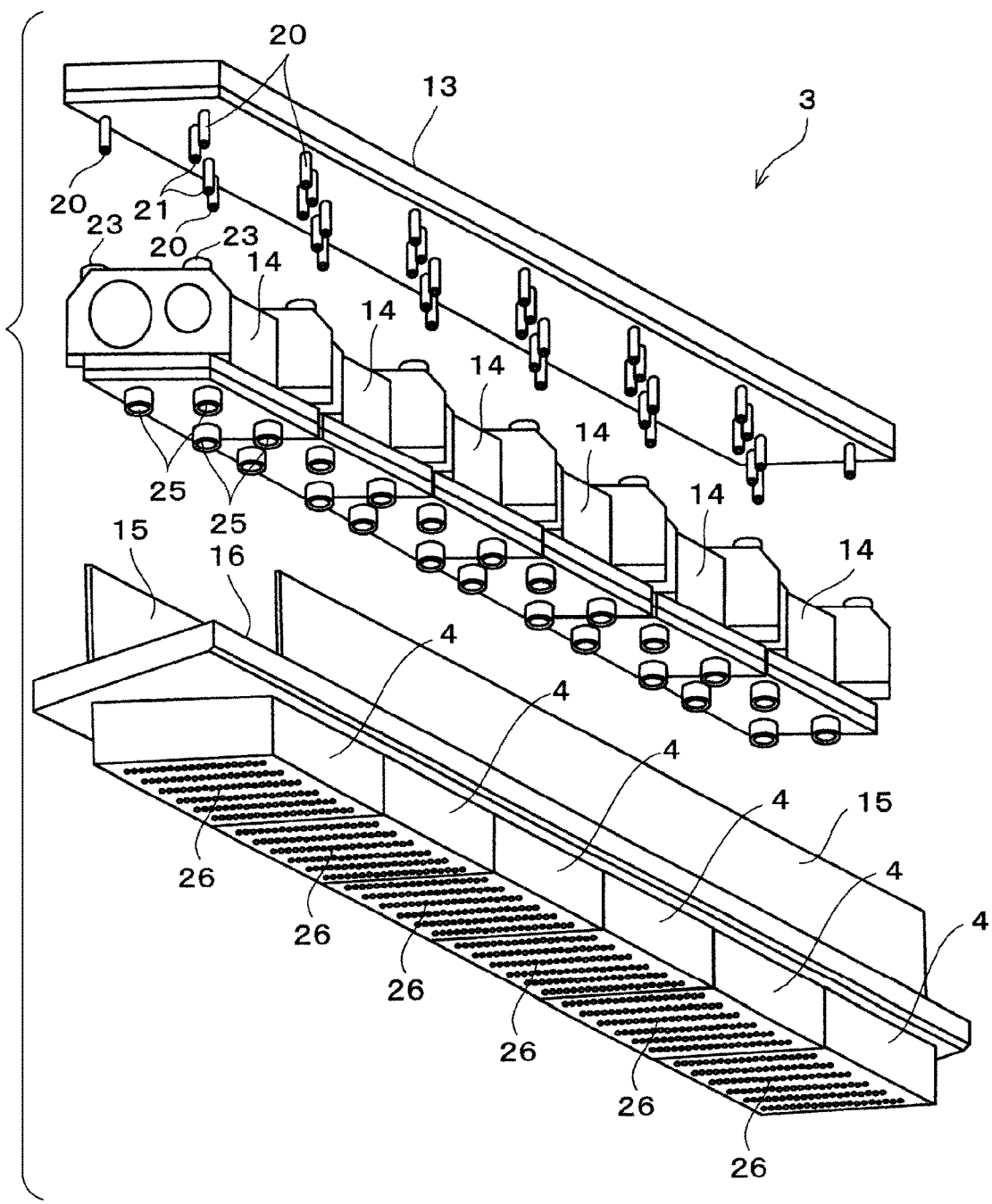
FIG. 3 is an exploded perspective view of the recording head as viewed from diagonally below.

FIG. 2 is an exploded perspective view of the recording head 3 as viewed from diagonally above, and FIG. 3 is an exploded perspective view of the recording head 3 as viewed from diagonally below. Hereinafter, a stacking direction of the configuration members of the recording head 3 will be described as the up-down direction, as appropriate. The recording head 3 in the present embodiment is provided with the flow path member 13, pressure adjustment members 14, a protection plate 15, and the head units 4. Flow paths which supply the ink to the head units 4 are formed in the flow path member 13, the pressure adjustment members 14 adjusts the pressure of the ink which flows in the inner portion, the protection plate 15 houses the pressure adjustment members 14 in the inner portion, and the head units 4 are attached to the bottom surface of a base plate 16 to which the protection plate 15 is fixed.

Figure 4:
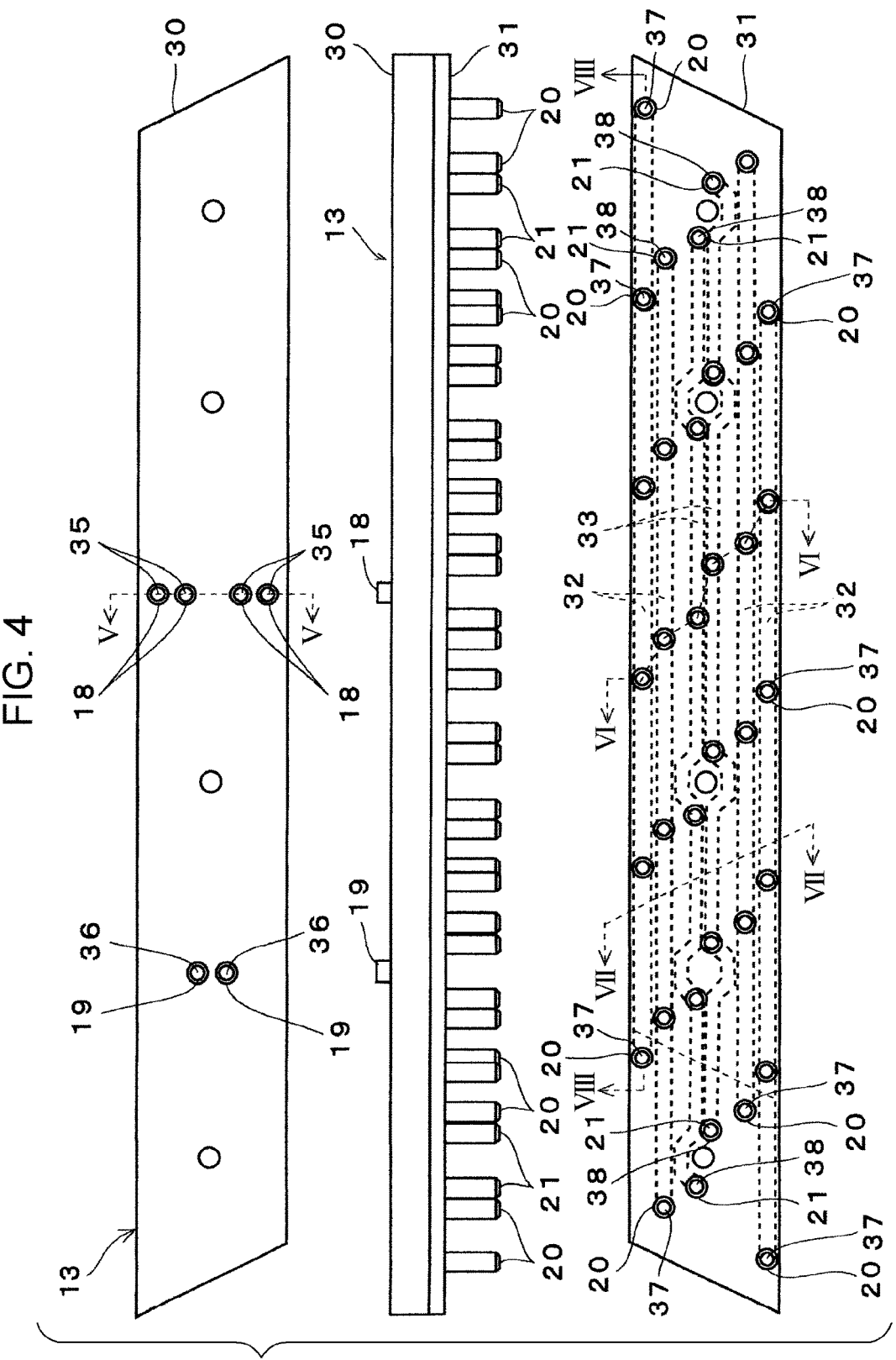
FIG. 4 is a view illustrating the configuration of a flow path member.

The flow path member 13 is a plate-shaped member which is made of a synthetic resin in which liquid flow paths 32 (a kind of flow path in the invention) and gas flow paths 33 (a kind of flow path in the invention) are formed and which supplies the ink to the head units 4. The ink flows in the inner portion of the liquid flow paths 32, and a gas (air) flows in the gas flow paths 33. A plurality (four in the present embodiment) of liquid inlet joints 18 (a kind of joint in the invention) to which the liquid supply tubes 8 corresponding to each of the colors are connected are formed on the top surface of the flow path member 13 (the top surface of a first substrate 30 which is described later) parallel to the first direction in a state of protruding in a tubular shape. In the present embodiment, as illustrated in FIG. 4, two of the liquid inlet joints 18 which are adjacent to each other form a set. One set is arranged close to one edge of the top surface of the first substrate 30 and the other set is arranged close to the other edge of the top surface of the first substrate 30 in the first direction. Therefore, a gap is formed between the sets of the liquid inlet joints 18. Each of the liquid inlet joints 18 communicates with a liquid outlet joint 20 (a kind of joint in the invention) which is formed in the bottom surface of the flow path member 13 (the bottom surface of a second substrate 31 which is described later) via the liquid flow paths 32 of the inner portion of the flow path member 13. A plurality (two in the present embodiment) of gas inlet joints 19 (a kind of joint in the invention) to which the gas supply tubes 9 are connected are formed in the top surface of the flow path member 13. As illustrated in FIG. 4, the gas inlet joints 19 are arranged in the center portion (a position corresponding to the gap between the sets of the liquid inlet joints 18) in the top surface of the first substrate 30 in the first direction. The gas inlet joints 19 communicate with gas outlet joints 21 (a kind of joint in the invention) which are formed in the bottom surface of the flow path member 13 via the gas flow paths of the inner portion of the flow path member 13. Four kinds (for example, black (K), cyan (C), magenta (M), and yellow (Y)) of ink are supplied to the flow path member 13 in the present embodiment through the liquid supply tubes 8, and two systems of air are supplied are supplied to the flow path member 13 through the gas supply tubes 9. The flow path member 13 distributes the four kinds of ink and two systems of air to a total of six of the head units 4 in the present embodiment. Detailed description of the flow path member 13 will be given later.

The pressure adjustment members 14 are member which are made of a synthetic resin and a plurality (six in the present embodiment) are arranged corresponding to the head units 4 in the space between the flow path member 13 and the base plate 16. A liquid inflow port 23 corresponding to the liquid outlet joint 20 of the flow path member 13 and a gas inflow port 24 corresponding to the gas outlet joint 21 of the flow path member 13 are formed in each of the top surfaces of the pressure adjustment members 14. The liquid inflow ports 23 communicate with liquid outflow ports 25 which are provided to protrude to below the pressure adjustment members 14 via the liquid flow paths which are formed in the inner portions of the pressure adjustment members 14. The liquid flow path of the inner portion of the pressure adjustment member 14 in the present embodiment is configured to be pressurized by the air which flows in from the gas inflow port 24. Therefore, due to the pump being driven and the air being pumped to the pressure adjustment members 14 via the gas supply tubes 9, the flow path member 13, and the gas inflow port 24, it is possible to increase the pressure of the ink inside the liquid flow paths, and thus it is possible to increase the pressure of the ink in the head units 4. Each of the pressure adjustment members 14 controls the opening and closing of the flow paths of the four systems of ink which are distributed to each of the head units 4 in the flow path member 13 and the supply pressure of the ink according to the two systems of air. By controlling the pressure of the ink inside the head unit 4, the recording head 3 is capable of performing a cleaning operation in which the ink is forcefully discharged from nozzles 26, or the like, for example.

The six head units 4 are lined up parallel to the second direction. Each of the head units 4 includes a head chip (not illustrated) which discharges ink from a plurality of the nozzles 26. In each of the head units 4, the nozzles 26 are lined up as a total of six nozzle rows parallel to a third direction which is inclined at a predetermined angle with respect to the first direction and the second direction. Four kind of ink which travel through via the pressure adjustment members 14 are supplied through the inner portion flow paths to the six nozzle rows. Each of the head units 4 is capable of selectively causing the ink which is introduced to the inner portion flow paths to be discharged from each of the nozzles 26 by driving actuators such as piezoelectric elements (not illustrated).

As illustrated in FIG. 2, four supply ports 27 are formed in the arrangement surface of the pressure adjustment member 14 in the base plate 16 for each of the head units 4. Each of the supply ports 27 communicates with an inner portion flow path of the head unit 4 corresponding to the supply port 27. In a state in which the pressure adjustment members 14 are mounted to the base plate 16, the supply ports 27 of the head units 4 are inserted into the liquid outflow ports 25 which form the exit flow paths of the pressure adjustment members 14. Therefore, the four kinds of ink are supplied to the four supply ports 27 of each of the head units 4 from the liquid outflow ports 25 of the pressure adjustment members 14.

Figure 5:
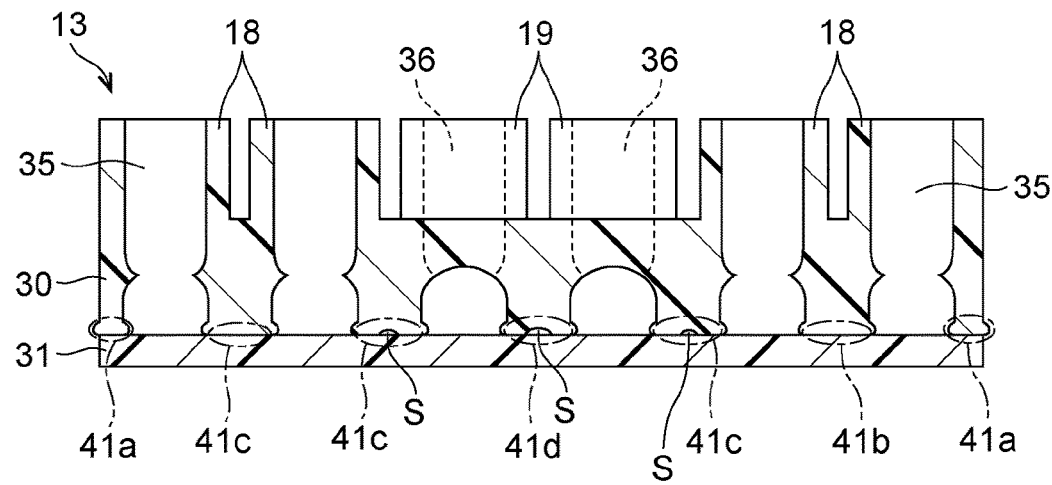
FIG. 5 is a sectional view taken along the line V-V in FIG. 4.
Figure 6:
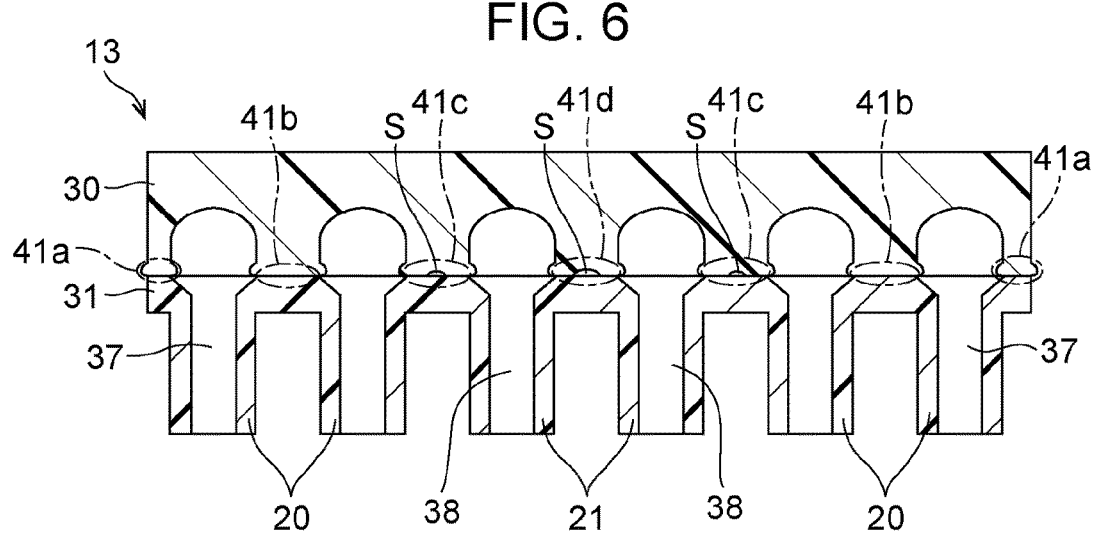
FIG. 6 is a sectional view taken along the line VI-VI in FIG. 4.
Figure 7:
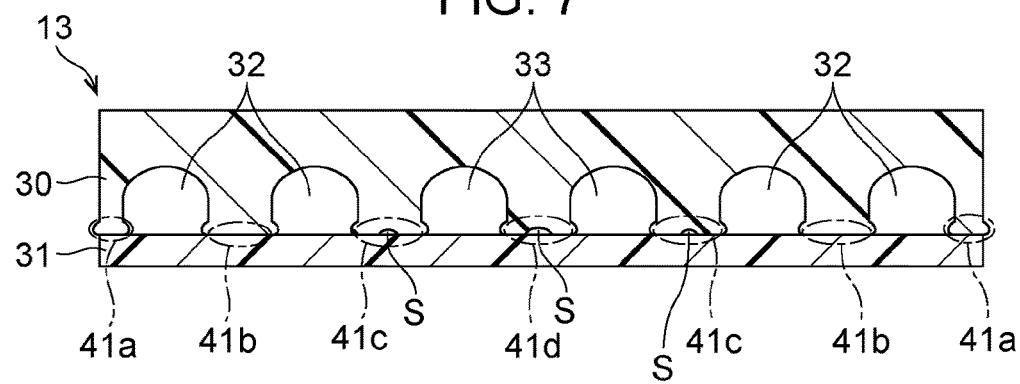
FIG. 7 is a sectional view taken along the line VII-VII in FIG. 4.
Figure 8:
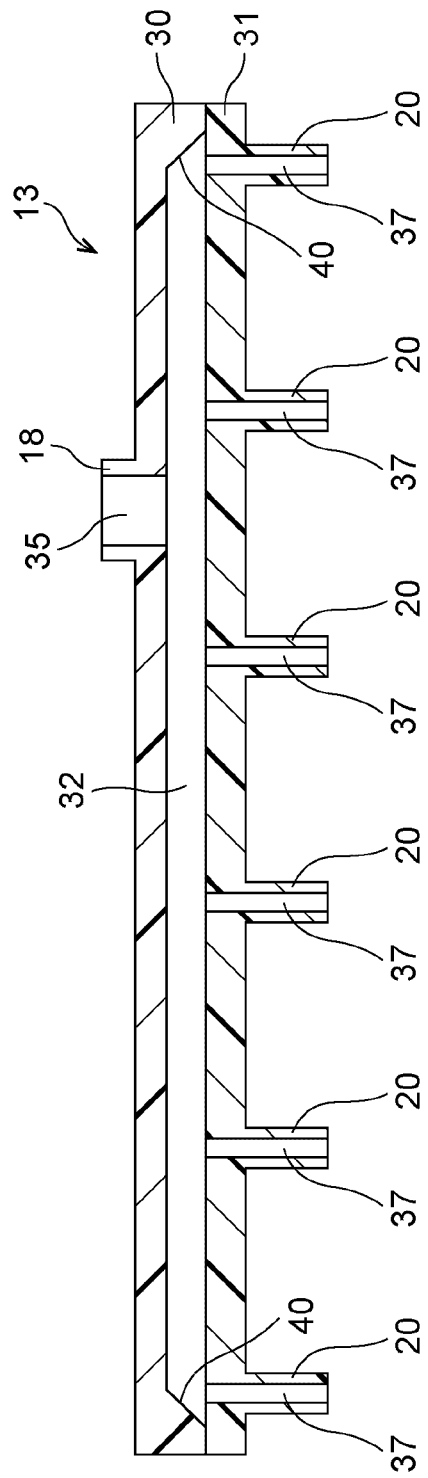
FIG. 8 is a sectional view taken along the line VIII-VIII in FIG. 4.

FIG. 4 is a top surface view (top level), a side view (middle level), and a bottom view (bottom level) of the flow path member 13. FIG. 5 is a sectional view taken along the line V-V in FIG. 4, FIG. 6 is a sectional view taken along the line VI-VI in FIG. 4, and FIG. 7 is a sectional view taken along the line VII-VII in FIG. 4. FIG. 8 is a sectional view taken along the line VIII-VIII in FIG. 4. The flow path member 13 in the present embodiment is a plate-shaped structure in which the first substrate 30 (a kind of first member in the invention) and the second substrate 31 (a kind of second member in the invention) are bonded in a mutually facing state. The first substrate 30 and the second substrate 31 are plate-shaped members which are long in the second direction, and are molded using a resin material such as polypropylene, for example. The first substrate 30 and the second substrate 31 are bonded using laser welding or ultrasonic wave welding in a state of being stacked together. In the present embodiment, the thickness of the first substrate 30 (here, the thickness of a portion excluding the protruding portion of the liquid inlet joint 18 or the like to be described later) is greater than the thickness of the second substrate 31 (similarly, the thickness of a portion excluding the protruding portion of the liquid outlet joint 20 or the like to be described later), and the first substrate 30 is molded using a resin material which is colored black or a color which is dense to an extent at which the color is recognized as close to black by human eye). To summarize, the first substrate 30 is manufactured using a thermoplastic resin which has absorbency (light absorbency) with respect to a laser beam. It is possible to use a resin which is obtained by mixing a predetermined colorant such as carbon black, a dye, or a pigment into a polyamide for the thermoplastic resin which has light absorbency. Regarding the "thickness" of the substrates 30 and 31, there is a case in which this means the thickness including the joints in cases that as particularly specified as described later.

The second substrate 31 is manufactured using a resin material which is thinner than the first substrate 30 and has transparency (optical transparency) with respect to a laser beam. Examples of the thermoplastic resin having optical transparency include polyamide (PA), polyethylene (PE), polypropylene (PP), polyethylene terephthalate (PET), polystyrene (PS), styrene-acrylonitrile copolymer, ABS resin, acrylic resin (PMMA), polycarbonate (PC), polybutylene terephthalate (PBT), and the like. If necessary, a thermoplastic resin to which reinforcing fibers such as glass fibers or carbon fibers, or a colorant are added may be used. Accordingly, it is possible to ensure that a laser beam in a welding step (a first step and a second step, described later) is transmitted by the second substrate 31 and is focused on the bonding portions (bonding scheduled portions 42 which are described later) of the first substrate 30. The optically absorbent material of the first substrate 30 and the optically transparent material of the second substrate 31 are not limited to 100% absorption or transmission of a laser beam L. An optically absorbent member and an optically transparent member may have different optical absorbency (or optical transmittance) from each other with respect to at least one wavelength of the laser beam L, and the optically absorbent member may transmit light more easily than the optically absorbent member. Therefore, the optically absorbent member and the optically transparent member may have optical absorbency (or optical transmittance) of less than 100%. The first substrate and the second substrate may be manufactured using a thermosetting resin.

As described above, the total of four of the liquid inlet joints 18 and the total of two of the gas inlet joints 19 are formed in the top surface of the first substrate 30 (the surface of the opposite side from the bonding surface of the second substrate 31, the top surface of the flow path member 13). The total of four of the liquid outlet joints 20 and the total of two of the gas outlet joints 21 are formed individually for each of the six head units 4 in the bottom surface of the second substrate 31 (the surface of the opposite side from the bonding surface of the first substrate 30, the bottom surface of the flow path member 13).

The four liquid flow paths 32 corresponding to each color of the ink and the two gas flow paths 33 are formed in the bonding surface of the first substrate 30 (the surface facing the second substrate 31). The liquid flow paths 32 and the gas flow paths 33 extend parallel to the second direction which is the longitudinal direction of the flow path member 13. In the first direction which is the short direction of the flow path member 13, a total of four of the liquid flow paths 32 are formed on both sides, two to each side to interpose two of the gas flow paths 33 therebetween. In other words, in the first direction of the flow path member 13, the gas flow paths 33 are formed on the center side, and the liquid flow paths 32 are arranged closer to the outside. Each of the liquid flow paths 32 is formed in a position which overlaps the liquid inlet joint 18 corresponding to the liquid flow path 32 in plan view, communicates with a liquid inlet path 35 which is formed inside the corresponding liquid inlet joint 18, and communicates with a liquid outlet path 37 which is formed inside the liquid outlet joint 20. Similarly, each of the gas flow paths 33 is formed so as to overlap the gas inlet joint 19 corresponding to the gas flow path 33 in plan view, communicates with a gas inlet path 36 which is formed inside the corresponding gas inlet joint 19, and communicates with a gas outlet path 38 which is formed in the gas outlet joint 21.

In the flow path member 13, the ink which flows in from the liquid inlet path 35 is split into two ways in the second direction and flows toward both end portions (both end portions in the second direction) of the liquid flow path 32. The ink which flows toward both end portions of the liquid flow paths 32 flows out from a total of six of the liquid outlet paths 37 in the present embodiment. The number and arrangement of the liquid inlet paths 35 and the liquid outlet paths 37 are not limited to those exemplified in the present embodiment.

Here, as illustrated in FIG. 8, both end surfaces which define both ends of the liquid flow path 32 in the longitudinal direction (the second direction) are inclined surfaces 40 which are inclined in a direction in which the inner dimension of the longitudinal direction of the liquid flow path 32 expands from the top surface side toward the bottom surface side of the first substrate 30. By adopting the inclined surfaces 40, it is possible to ensure that the ink which flows in the liquid flow path 32 parallel to the second direction is guided by the inclined surfaces 40 to flow smoothly to the liquid outlet paths 37 which are positioned at both ends of the liquid outlet paths 37 which are lined up in the second direction. Accordingly, the ink remaining at both ends of the liquid flow path 32 is reduced, and as a result, it is possible to improve the discharge properties of bubbles.

Figure 9:
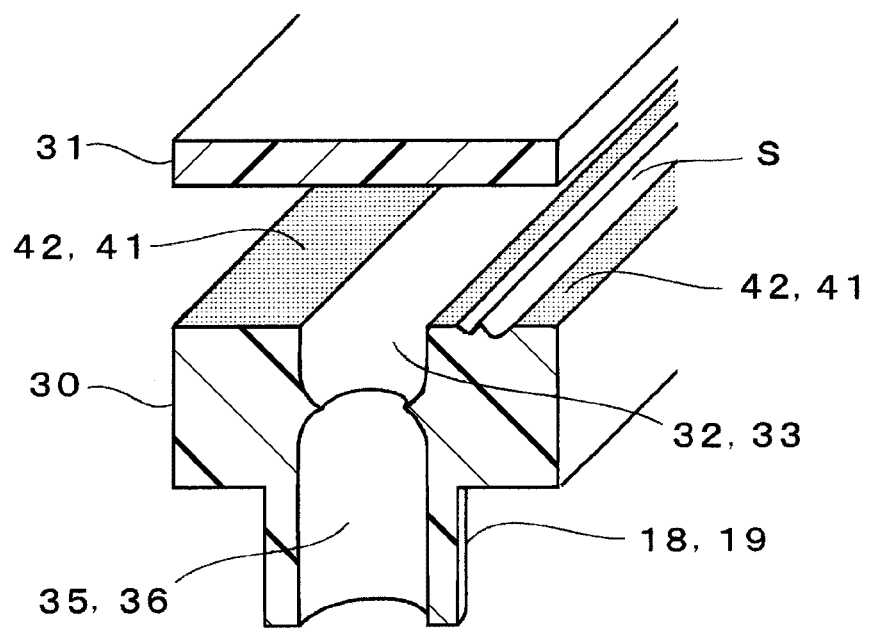
FIG. 9 is a schematic view illustrating a bonding structure of a liquid flow path in the vicinity of a liquid inlet joint.
Figure 10:
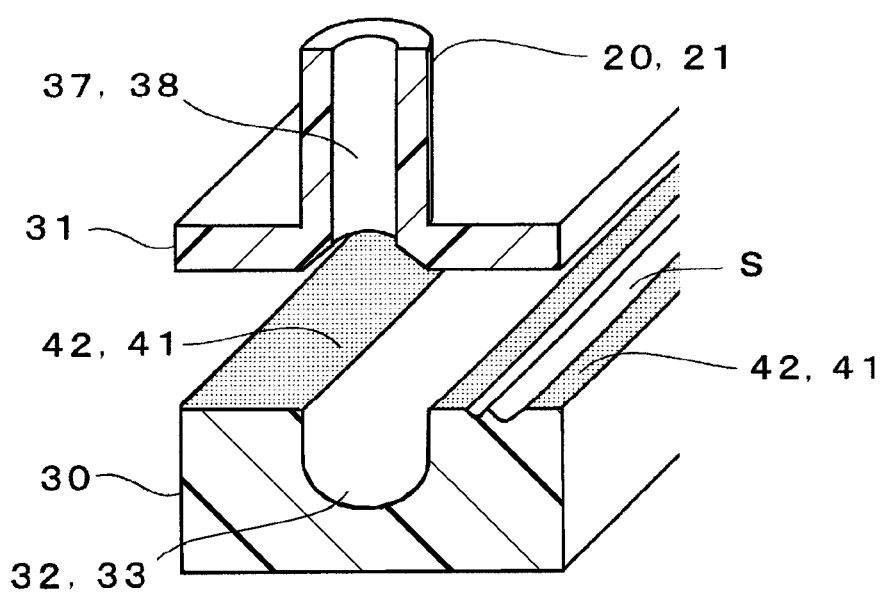
FIG. 10 is a schematic view illustrating the bonding structure of the liquid flow path in the vicinity of a liquid outlet joint.

FIGS. 9 and 10 are sectional perspective views illustrating the bonding between the first substrate 30 and the second substrate 31. More specifically, FIG. 9 schematically illustrates the bonding structure of the liquid flow path 32 in the vicinity of the liquid inlet joint 18, and FIG. 10 schematically illustrates the bonding structure of the liquid flow path 32 in the vicinity of a liquid outlet joint 20. The bonding structure of the gas flow path is substantially the same structure as illustrated in FIGS. 9 and 10. Sink marks S (the non-bonding portion) which are illustrated in the drawings indicate that there is a possibility that the sink marks S will arise in bonding portions 41 and do not indicate a certainty that the sink marks S will arise in all of the bonding portions 41. The liquid flow paths 32 and the gas flow paths 33 are stacked such that the bonding surfaces of the first substrate 30 and the second substrate 31 are caused to contact each other, and are formed by bonding an opening peripheral edge portion of a vacant portion (for example, a groove or a recessed portion) which serves as the flow path which is formed in at least one of the first substrate 30 and the second substrate 31. In other words, in plan view, due to the peripheries of the liquid flow paths 32 and the gas flow paths 33 being surrounded by the bonding portions 41, the external shapes of the liquid flow paths 32 and the gas flow paths 33 are defined by the bonding portions 41 as flow paths in plan view. At the opening peripheral edge portion of the flow path vacant portion, the portion which bonds the first substrate 30 and the second substrate 31 to each other is the bonding portions 41. At the stage before the bonding (before the welding), the portions corresponding to the bonding portions 41 are the bonding scheduled portions 42 (described later). At the bonding scheduled portions 42, due to the resin being melted by the heat of a laser or the like and the relevant portion solidifying due to a drop in temperature, the portions at which the first substrate 30 and the second substrate 31 are welded are the bonding portions 41. Therefore, there is a case in which the bonding portions 41 are portions at which the resin of the first substrate 30 and the resin of the second substrate 31 are melted together and are melted into each other. As appropriate, the bonding scheduled portions 42 before the welding are included in reference to the bonding portion 41.

In plan view, the periphery of the liquid flow paths 32 and the gas flow paths 33 are surrounded by the bonding portion 41. As described above, since although the first substrate 30 is configured using an optically absorbent member, the second substrate 31 is configured using an optically transparent member, during the bonding of the first substrate 30 and the second substrate 31, the laser beam is radiated from the surface of the second substrate 31 and is focused on the bonding portion 41 (the bonding scheduled portions 42) of the first substrate 30, and after the bonding portion 41 is melted, the relevant portion is welded due to solidification. Therefore, the bonding portion 41 which surrounds the liquid flow paths 32 and 33 is configured by a welding surface using laser welding and corresponds to the welding portion in the invention.

Here, when molding a component which is made of resin such as the first substrate 30 and the second substrate 31 which configure the flow path member 13 in the present embodiment, so-called sink marks (corresponding to the non-bonding portion) S in which a portion of the surface is depressed arise. The sink marks S arise more easily the thicker the component which is made of resin is overall, and arise more easily at portions which are thicker than the other portions of the same component which is made of resin. The sink marks S arise easily close to the center portion of the component which is made of resin. When defining the thick portion, firstly, the thick portion means a portion which is relatively thicker than the other portions of the same member. For example, in the first substrate 30, the portion in which the joints 18 and 19 are formed (the bonding portion 41 extending from the wall that forms the joints 18 and 19), the inclined surfaces 40 (refer to FIG. 8) which define both ends of the liquid flow path 32 in the longitudinal direction (the second direction), partitioning walls 72 (refer to FIG. 20) which partition nut housing portions 70 (described later), or the like. Secondly, the thick portion means a portion which is relatively thick among the portions which define the flow path in the same member (the portions which form the walls which partition the flow paths). For example, the portions in which the joints 18 and 19 are formed, the inclined surfaces 40 of the liquid flow path 32, and the like. Thirdly, the thick portion means a portion which is thicker than the portion which defines the flow paths of one of the members among the first member and the second member which configure the flow path member and which defines the flow paths of the other member. For example, the bonding portion 41 or the like of the first substrate 30 which is the other member which is thicker than the portion corresponding to the bonding portion 41 of the second substrate 31 which is the one member. Fourthly, the thick portion is a portion of the other member which is thicker than the thickest portion of the one member among the first member and the second member which configure the flow path member. For example, as described later, the thick portion is a thick portion 54 (refer to FIG. 17) of the first substrate 52 which is the other member and is thicker than a partitioning wall 53b of a second substrate 53 which is the one member. A thin portion means a portion which is not the thick portion in each of the first to fourth definitions above. For example, the thin portion is the thinnest portion of the portion which defines the flow paths (excluding the flow paths inside the joints) which are parallel to the bonding surfaces of the members which configure the flow path member. Alternatively, the thin portion is a portion of the second substrate 31 in which the joints 20 and 21 are not formed. Alternatively, the thin portion is a thin portion 55 (refer to FIG. 18) which is relatively thin among the portions which define flow paths 57 in the first substrate 52 as described later.

In the present embodiment, in particular, in the first substrate 30 which is thicker than the second substrate 31 overall, the sink marks S arise easily at the bonding portion 41 of the center portion of the region in which a plurality of the liquid inlet joints 18 and the gas inlet joints 19 are formed densely. There is a case in which the bonding is insufficient at portions at which the sink marks S arise in the bonding surfaces (the boundary) between the components. As illustrated in FIGS. 9 and 10, in a case in which the sink marks S arise in the bonding portion 41 which defines the flow paths and the like, there is a problem in that problems such as the liquid leaking from the portions at which the bonding is insufficient and the like arise. In light of these problems, in the manufacturing method of the flow path member 13 in the present embodiment, even in a case in which the sink marks S arise in the bonding portion 41, it is possible to more reliably bond the first substrate 30 and the second substrate 31. Hereinafter, a description of this point will be given.

Figure 11:
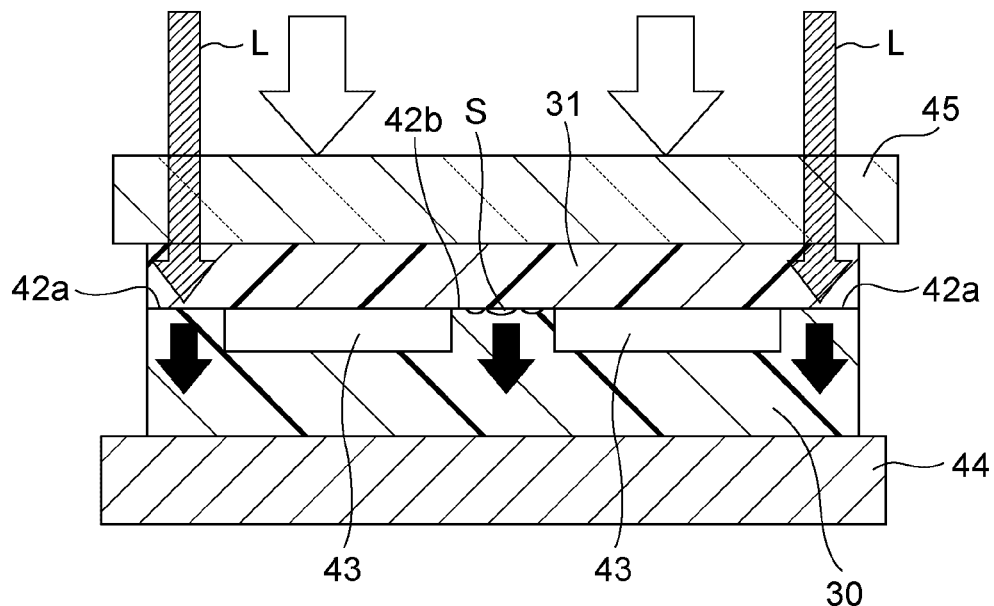
FIG. 11 is a view illustrating a manufacturing step of the flow path member.
Figure 12:
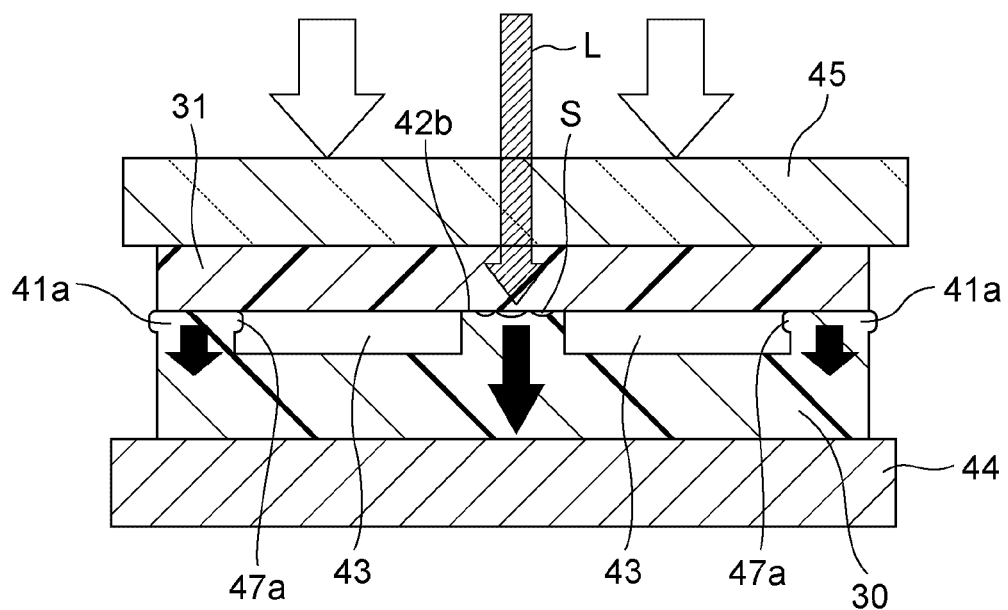
FIG. 12 is a view illustrating the manufacturing step of the flow path member.
Figure 13:
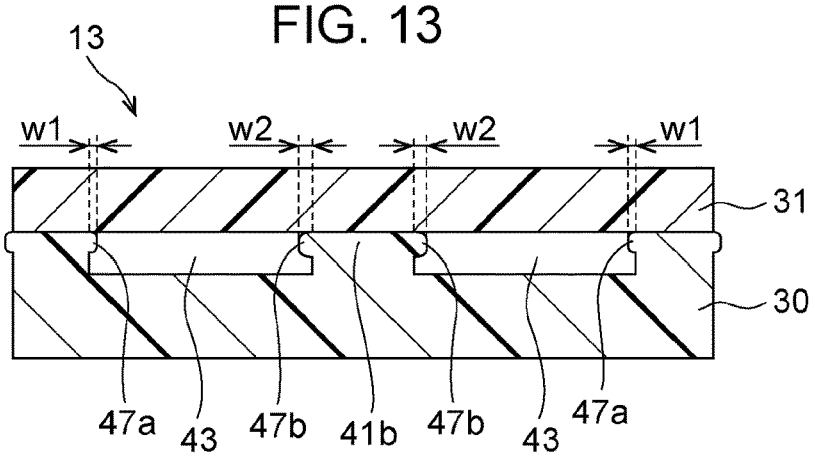
FIG. 13 is a view illustrating the manufacturing step of the flow path member.

FIGS. 11 to 13 are step views illustrating the manufacturing method of the flow path member 13, mainly the bonding (the welding) between the first substrate 30 and the second substrate 31. In these views, the first substrate 30 and the second substrate 31 are schematically illustrated to facilitate understanding. In the views, the portions which serve as the liquid flow paths 32 and the gas flow paths 33 are illustrated as vacant portions 43. The opening peripheral edge portions of the vacant portions 43 in the bonding surface of the first substrate 30 are the bonding scheduled portions 42 which are the portions which serve as the welded bonding portion 41. The sink marks S arise at the end surfaces (the peak surfaces) of the bonding scheduled portions 42 which are provided at positions close to the center portion of the first substrate 30. Hereinafter, such portions will be referred to as sink mark arising portions.

As illustrated in FIG. 11, the first substrate 30 and the second substrate 31 are stacked and are placed on a support stand 44 in a state in which the bonding surfaces thereof are in contact with each other. The support stand 44 supports a surface of the opposite side from the bonding surface of the second substrate 31 side of the first substrate 30. For example, a pressing plate 45 which has optical transparency such as glass is arranged on the bonding surface of the opposite side from the first substrate 30 of the second substrate 31 in a state in which the first substrate 30 is placed on the support stand 44. Accordingly, the first substrate 30 and the second substrate 31 which are stacked assume a state of being interposed between the support stand 44 and the pressing plate 45. As illustrated by the white arrows in FIG. 11, the pressing plate 45 presses the second substrate 31 with a predetermined force toward the support stand 44 side in a direction (a stacking direction) in which the first substrate 30 and the second substrate 31 approach each other. Accordingly, a pressure is applied to each of the bonding scheduled portions 42 as illustrated by each of the black arrows. Assuming that the bonding scheduled portions 42 are aligned on the same surface, the pressure which is applied to each of the bonding scheduled portions 42 is substantially equal at the stage of before the bonding (before the welding).

In the state which is described above, first, the laser beam L is radiated and focused on first bonding scheduled portions 42a which are in the most distant positions from the sink mark arising portions among a plurality of bonding scheduled portions 42 are lined up through the pressing plate 45 and the second substrate 31, and the portions melt due to the heat. The laser beam L is selected, as appropriate, according to the absorption spectrum, the plate thickness (transmission length), and the like of the material of the second substrate 31. The irradiation of the bonding scheduled portions 42 with the laser beam may be performed using batch irradiation or using a scanning system in which the spot of a laser beam is caused to move along the bonding scheduled portions 42. As in a subsequent second bonding scheduled portion 42b, in a case in which the irradiation of the portions at which the sink marks S arise with the laser beam is divided into a plurality of times, it is preferable to ensure that the radiation of the laser beam is not split at the portions at which the sink marks S arise.

The heat which is generated when the first bonding scheduled portions 42a is irradiated with the laser beam is also transmitted to the portions corresponding to the first bonding scheduled portions 42a of the second substrate 31 and the portions melts. Due to these portions solidifying (curing), the first substrate 30 and the second substrate 31 are welded to each other (a first step). First bonding portions 41*a* which are formed by the first bonding scheduled portions 42*a* melting and curing correspond to first welding portions in the invention. In the first step, since the resin (including the resin of the first substrate 30 and the resin of the second substrate 31, the same applies hereinafter) in the first bonding scheduled portion 42*a* melts, the heights of the surfaces which are the first bonding scheduled portions 42*a* until this point becomes slightly lower than the heights of the surfaces of the second bonding scheduled portions 42*b*. Therefore, in the first step, the pressure which is applied to the first bonding scheduled portions 42*a* in accordance with the lowering of the height of the first bonding scheduled portions 42*a* is reduced to lower than the pressure at the beginning of the first step, and accordingly, the pressure which is applied to the second bonding scheduled portions 42*b* increases to more than the pressure which is applied to the first bonding scheduled portions 42*a* and the second bonding scheduled portions 42*b* at the beginning of the first step by this amount (refer to the black arrows in FIG. 12). Accordingly, in the second bonding scheduled portions 42*b*, the resin portion assumes a state of being slightly compressed and having stress due to the pressure. In the present embodiment, the first substrate 30 and the second substrate 31 are interposed between the pressing plate 45 and the support stand 44 and are maintained in a substantially flat state (a state in which the shapes of the main bodies of the first substrate 30 and the second substrate 31 are maintained). In other words, excluding partial deformation as in the bonding scheduled portions 42, the substrates 30 and 31 maintain their initial shapes overall. In the first bonding portions 41*a*, portions of the melted resin assume shapes which protrude into the vacant portions 43 which form the flow paths. The portions which partially overhang to the vacant portion 43 side from the main bodies (the wall surfaces which partition the vacant portions 43) of the first substrate 30 or the second substrate 31 are first overhang portions 47*a*.

After the first step, the laser beam L is radiated and focused on the second bonding scheduled portions 42*b* which are in closer positions to the sink mark arising portions and the resin of the relevant portions is melted in a state in which a pressure which is applied to the second bonding scheduled portions 42*b* is increased, subsequently, the first substrate 30 and the second substrate 31 are welded to each other at the relevant portions (second step). Second bonding portions 41*b* which are formed by the resin at the second bonding scheduled portions 42*b* melting and curing correspond to the second welding portions in the invention. Since the pressure which is applied to the second bonding scheduled portions 42*b* at the beginning of the second step is greater than the pressure which is applied to the first bonding scheduled portions 42*a* and the second bonding scheduled portions 42*b* at the beginning of the first step, even in a case in which the sink marks S arise in the end surfaces of the second bonding scheduled portions 42*b*, the adhering force between the first substrate 30 and the second substrate 31 at the relevant portions is increased. When the laser beam L is radiated and focused on the second bonding scheduled portions 42*b* and the resin of the relevant portions melts, as illustrated in FIG. 13, the sink marks S vanish (or are reduced to a degree at which the sink marks S can be generally ignored), and due to the subsequent curing, the first substrate 30 and the second substrate 31 are welded at the second bonding portions 41*b*. The vacant portions 43 which serve as the liquid flow paths 32 and the gas flow paths 33 are partitioned and formed in a state of being more reliably sealed (a state in which liquid-tightness is secured and a state in which gas-tightness is secured). As a result, liquid leaking in the liquid flow paths 32 and air leaking in the gas flow paths 33 are reduced. Since the first substrate 30 and the second substrate 31 are bonded in a state of being interposed between the pressing plate 45 and the support stand 44 and being maintained in a substantially flat state, the relative positional deviation between the first substrate 30 and the second substrate 31 is reduced. Accordingly, it is possible to manufacture the flow path member 13 in which the first substrate 30 and the second substrate 31 are bonded at a higher positional accuracy. In the same manner as the first bonding portions 41*a*, second overhang portions 47*b* which protrude into the vacant portions 43 in which a portion of the melted resin serves as the flow paths are formed in the second bonding portions 41*b* which are formed in this manner. An overhang amount w2 of the second overhang portions 47*b* is greater than an overhang amount w1 of the first overhang portions 47*a*. In other words, since the overhang amount w2 of the second overhang portions 47*b* is greater than the overhang amount w1 of the first overhang portions 47*a*, this indicates that the pressure which is applied during the welding of the second bonding portions 41*b* is greater than the force which is applied during the welding of the first bonding portions 41*a*. Accordingly, the first substrate 30 and the second substrate 31 are more reliably welded at the second bonding portions 41*b*.

The first step and the second step in the manufacturing method indicate the relative order of the steps, and in a case in which the number of the bonding scheduled portions 42 which are location to be welded is greater than the cases of FIGS. 11 to 13, the first step and the second step are repeated in order from the bonding scheduled portions 42 of positions which are more distant from the portions at which the sink marks S arise easily (the center portion, the thick portions, or the joints of the configuration members). In other words, when explaining using the drawings of FIGS. 5 to 7, the welding step is performed in order from the first bonding portion 41*a* which is positioned closest to the outside in the line-up direction (the first direction) of the flow paths 32 and 33, the second bonding portion 41*b*, a third bonding portion 41*c*, and a fourth bonding portion 41*d*. In this case, for example, when performing the welding on the third bonding portion 41*c*, the welding step of the second bonding portion 41*b* (the first bonding portion) which is one prior is the first step, and the welding step of the third bonding portion 41*c* (the second bonding portion) is the second step. In FIGS. 5 to 7, for the sake of convenience, it is assumed that the sink marks S arise at the bonding portions 41; however, in a case in which the flow path member 13 is manufactured by the present manufacturing method, almost no sink marks S remain. In this manner, it is possible to more reliably weld the first member and the second member at the bonding portions 41 of the portions at which the sink marks S arise easily (the center portion, the thick portions, or the joints of the configuration members). Therefore, even in a case in which the sink marks S are present in the bonding portions 41, the flow paths which are defined by the first member (the first substrate 30) and the second member (the second substrate 31) are partitioned and formed in a more reliably sealed state. In the positional relationship between the bonding portions 41 (the bonding scheduled portions 42), the plurality of bonding portions 41 (the first bonding portions) which are formed in the welding of the first step are provided at positions to interpose the bonding portions 41 (the second bonding portions) which are formed in the welding of the second step. Accordingly, since the force which acts on the second bonding portions in accordance with the welding of the plurality of first bonding portions in the first step increases, it is possible to more reliably weld the second bonding portions at which the sink marks S arise easily.

In the present embodiment, in the stacking direction of the first substrate 30 and the second substrate 31, since the thickness of the portions (the portions facing the flow paths 32 and 33) which define the flow paths 32 and 33 of the second substrate 31 is thinner than the thickness of the portions which define the flow paths 32 and 33 of the first substrate 30, it is possible to focus the portions at which the sink marks S arise easily on the first substrate 30. Therefore, in comparison to a case in which portions in which sink marks arise easily are provided on both the first substrate 30 and the second substrate 31, it is clearer as to which positions to provide the first bonding portions and the second bonding portions and the layout of the bonding portions 41 and the flow paths 32 and 33 is simple. With respect to the welding method, in the present embodiment, it is possible to improve the transparency with respect to a laser beam by rendering the second substrate 31 of the optically transparent material thinner than the first substrate 30 overall. However, although welding by laser beam is exemplified, the embodiment is not limited thereto, and it is possible to adopt a welding method which uses ultrasonic waves. In this case, the first substrate 30 may not necessarily be an optically absorbent member, and similarly, the second substrate 31 may not necessarily be an optically transparent member. In the present embodiment, by providing more of the portions at which the sink marks S arise easily in the first substrate 30 than the second substrate 31, it is easy to ensure that the diameters of the liquid inlet paths 35 inside the liquid inlet joints 18 are larger than the diameters of the liquid outlet paths 37 inside the liquid outlet joints 20, and that the diameters of the gas inlet paths 36 inside the gas inlet joints 19 are larger than the diameters of the gas outlet paths 38 inside the gas outlet joints 21. Accordingly, it is possible to reduce the pressure loss in the liquid inlet paths 35 and the gas inlet paths 36 before the liquid outlet paths 37 and the gas outlet paths 38 split.

Figure 14:
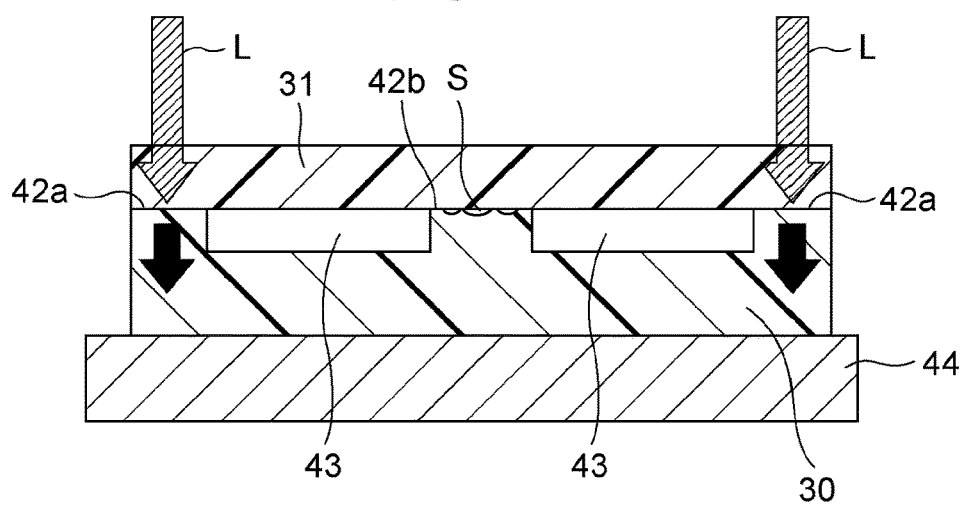
FIG. 14 is a view illustrating a modification example of the manufacturing step of the flow path member.
Figure 15:
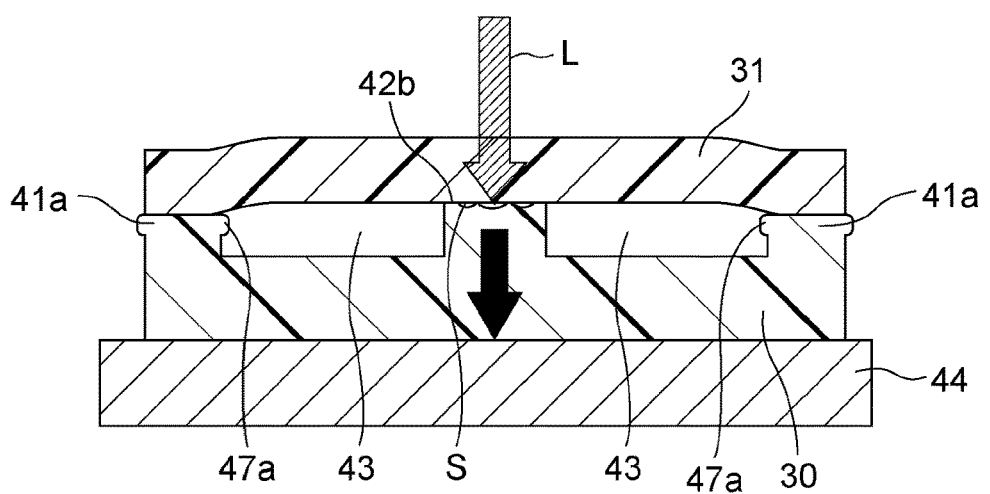
FIG. 15 is a view illustrating a modification example of the manufacturing step of the flow path member.
Figure 16:
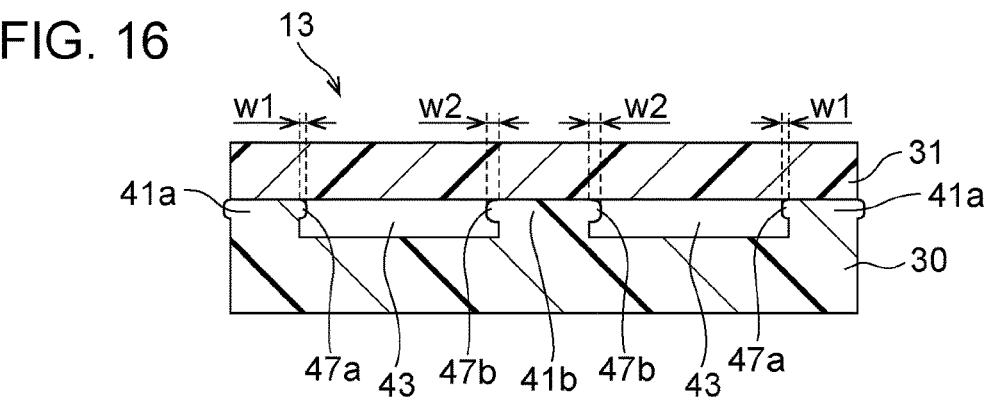
FIG. 16 is a view illustrating a modification example of the manufacturing step of the flow path member.

FIGS. 14 to 16 are step views illustrating a modification example of the manufacturing method of the flow path member 13 (the bonding between the first substrate 30 and the second substrate 31). In the present modification example, the manufacturing method is different from the one described above in that the welding is performed without the first substrate 30 and the second substrate 31 which are stacked being pressed by the pressing plate 45. In other words, as illustrated in FIG. 14, the first substrate 30 and the second substrate 31 are stacked and are placed on the support stand 44 in a state in which the bonding surfaces thereof are in contact with each other. In this state, first, the first substrate 30 and the second substrate 31 are welded to each other on the first bonding scheduled portions 42a which are in the most distant positions from the sink mark arising portions among a plurality of bonding scheduled portions 42 which are lined up (the first step). During the irradiation of the laser beam, pressure is applied toward the first bonding scheduled portions 42 from the surface of the opposite side from the bonding surface of the second substrate 31 (the black arrows in FIG. 14). Accordingly, although some degree of pressure is applied to the second bonding scheduled portions 42b, the pressure is not actively applied.

In the first step, the first bonding portions 41a which are formed by the resin in the first bonding scheduled portions 42a melting and curing correspond to the first welding portions in the invention. In the first step, since the resin in the first bonding scheduled portions 42a melts, and the heights of the surfaces of the portions which are the first bonding scheduled portions 42a until this point become slightly lower than the heights of the surfaces of the second bonding scheduled portions 42b. Accordingly, the first substrate 30 assumes a warped state, and in the second step, a combined force in the substrate stacking direction of the pressing force which is applied to the bonding scheduled portions 42b during the irradiation of the laser beam in the second step and the restorative force to return to the original flat shape of the first substrate 30 is applied to the second bonding scheduled portions 42b. Accordingly, the pressure which is applied to the second bonding scheduled portions 42b increases to more than the pressure at the beginning of the first step (the black arrow in FIG. 15). In the present modification example, the first overhang portions 47a in which a portion of the melted resin protrudes into the vacant portions 43 are formed in the first bonding portions 41a.

After the first step, the first substrate 30 and the second substrate 31 are welded to each other at the second bonding scheduled portions 42b which are at positions closer to the arising portions of the sink marks S in a state in which the pressure which is applied to the second bonding scheduled portions 42b is increased (the second step). Second bonding portions 41b which are formed by the resin at the second bonding scheduled portions 42b melting and curing correspond to the second welding portions in the invention. In this manner, in the first step, due to the first substrate 30 and the second substrate 31 being welded at the first bonding scheduled portions 42a (the first bonding portions 41a), at least one of the substrates 30 and 31 assumes a warped state, and in the second step, due to the first substrate 30 and the second substrate 31 being welded at the second bonding scheduled portions 42b (the second bonding portions 41b), the first substrate 30 and the second substrate 31 are bonded such that the warping of the warped substrates is reduced (approaches the original flat state). Accordingly, since the pressure which is applied to the second bonding scheduled portions 42b at the beginning of the second step is increased to more than the pressure which is applied to the first bonding scheduled portions 42a and the second bonding scheduled portions 42b at the beginning of the first step by the amount of the restorative force of the warped substrate, even in a case in which the sink marks S arise in the second bonding scheduled portions 42b, when the laser beam L is radiated and focused on the second bonding scheduled portions 42b and the resin of the relevant portions is melted, the sink marks S are lost or reduced, the first substrate 30 and the second substrate 31 are welded at the second bonding portions 41b due to the subsequent curing, and the vacant portions 43 which serve as the liquid flow paths 32 and the gas flow paths 33 are partitioned and formed in a more reliably sealed state. As a result, liquid leaking in the liquid flow paths 32 and air leaking in the gas flow paths 33 are reduced. In the same manner as the first bonding portions 41a, the second overhang portions 47b in which portions of the melted resin protrude into the vacant portions 43 are formed in the second bonding portions 41b which are formed in this manner. The overhang amount of the second overhang portions 47b is greater than the overhang amount of the first overhang portions 47a. In the recording head 3 and the printer 1 which are provided with the flow path member 13, since the concern of liquid leaking in the liquid flow paths 32 and air leaking in the gas flow paths 33 is little, the reliability is improved.

Figure 17:
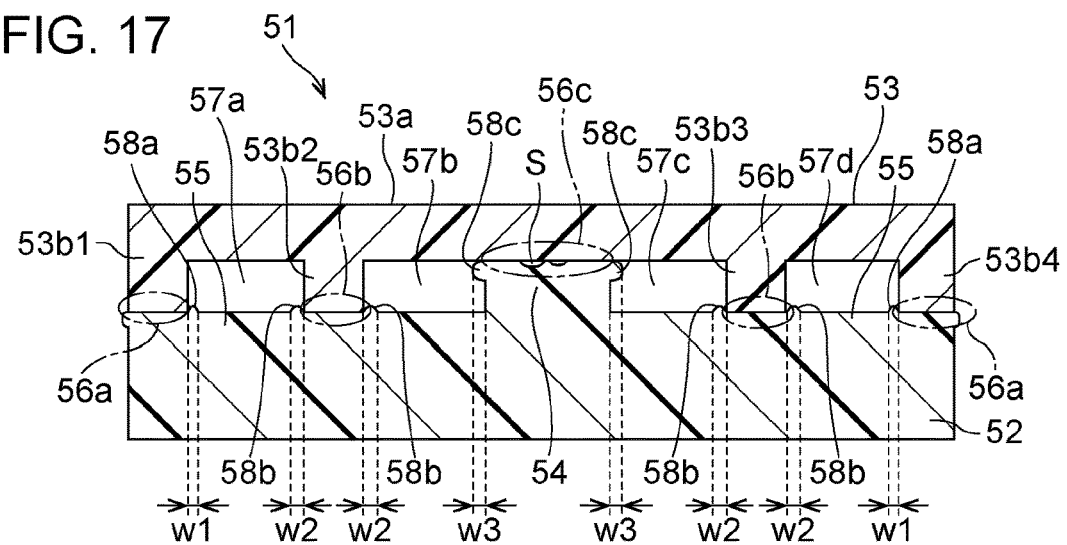
FIG. 17 is a sectional view of a flow path member in a second embodiment.

FIG. 17 is a sectional view illustrating a configuration of a flow path member 51 in the second embodiment. The first substrate 52 in the present embodiment (a kind of the first member in the invention) includes the thick portion 54 which is thicker than the second substrate 53 overall and is relatively thick, and the thin portion 55 which is relatively thin. The second substrate 53 (a kind of the second member in the invention) includes a substrate main body portion 53a and partitioning walls 53b which extend from each of the bonding surfaces (the surfaces facing the first substrate 52) of the substrate main body portion 53a toward the first substrate 52 side. The partitioning walls 53b are walls which extend in the second direction and a plurality (a total of four in the present embodiment, partitioning walls 53b1 to 53b4) is provided leaving spaces between the partitioning walls 53b in the first direction. In addition to the partitioning walls 53b which are parallel to the second direction, terminating walls (not illustrated) which extend toward the first substrate 52 side from both edges in the second direction of the bonding surface of the substrate main body portion 53a. The terminating walls are walls which define the ends of the flow paths 57 in the second direction. The length from the surface of the bonding surface side of the substrate main body portion 53a to the end surfaces of the partitioning walls 53b (the length from the surface of the bonding surface side of the substrate main body portion 53a to the end surfaces of the terminating walls) is aligned to the height difference of the thick portion 54 and the thin portion 55 in the bonding surface (the surface facing the second substrate 53) of the first substrate 52. The interval between the second partitioning wall 53b2 and the third partitioning wall 53b3 is set to be larger than the interval between the first partitioning wall 53b1 and the second partitioning wall 53b2 or the interval between the third partitioning wall 53b3 and the fourth partitioning wall 53b4 to the degree that the thick portion 54 of the first substrate 52 is arranged between the second partitioning wall 53b2 and the third partitioning wall 53b3. In other words, the first partitioning wall 53b1 and the second partitioning wall 53b2 are walls for partitioning a first flow path 57a and the second partitioning wall 53b2 is also a wall for partitioning a second flow path 57b with the thick portion 54 of the first substrate 52. Similarly, the third partitioning wall 53b3 and the fourth partitioning wall 53b4 are walls for partitioning a fourth flow path 57d and the third partitioning wall 53b3 is also a wall for partitioning a third flow path 57c with the thick portion 54 of the first substrate 52. The thickness at the partitioning walls 53b which are the thickest portions of the second substrate 53 is thinner than the thickness of the thick portion 54 in the first substrate 52.

In the first substrate 52, portions which abut both the end surface of the first partitioning wall 53b1 and the end surface of the fourth partitioning wall 53b4 of the second substrate 53 are first bonding portions 56a. Similarly, in the first substrate 52, portions which abut both the end surface of the second partitioning wall 53b2 and the end surface of the third partitioning wall 53b3 of the second substrate 53 are second bonding portions 56b. The end surface of the thick portion 54 of the first substrate 52 which abuts the bonding surface of the substrate main body portion 53a of the second substrate 53 is a third bonding portion 56c. The flow paths 57a to 57d are formed in the inner portion of a flow path member 66 due to the first substrate 52 and the second substrate 53 being bonded at the bonding portions 56. In the present embodiment, with respect to the distance from the thick portion 54, the first bonding portions 56a are the furthest, the third bonding portion 56c is the closest, and the second bonding portions 56b are an intermediate distance. In the present embodiment, the first flow path 57a and the fourth flow path 57d are used as flow paths for the liquid, and the second flow path 57b and the third flow path 57c are used as flow paths for the gas. The first flow path 57a and the fourth flow path 57d are defined by the first bonding portions 56a which are positioned closest to the outside in the direction in which the flow paths 57 are lined up (the first direction) and the second bonding portions 56b which are positioned one closer to the inside (the center portion side), and the second flow path 57b and the third flow path 57c are defined by the second bonding portions 56b and the third bonding portion 56c.

In the present embodiment, the sink marks S arise easily in the peak surface of the thick portion 54. Therefore, when bonding the first substrate 52 to the second substrate 53, in the same manner as in the first embodiment (or the modification example), first, welding is performed using a laser or ultrasonic waves on the first bonding portions 56a which are present at positions furthest from the thick portion 54, and next, welding is performed on the second bonding portions 56b. Subsequently, welding is performed on the third bonding portion 56c. Even in the present embodiment, since the pressure which is applied to the second bonding portions at the beginning of the second step (the welding step of the second bonding portions 56b (the second welding portions) after the welding step (the first step) of the first bonding portions 56a (the first welding portions) or the welding step of the third bonding portion 56c (the second welding portions) after the welding step (the first step) of the second bonding portions 56b (the first welding portions)) is greater than the pressure which is applied to the first welding portions and the second welding portions at the beginning of the first step in accordance with the melting of the resin portion of the first welding portions in the first step, even in a case in which the sink marks S arise in the end surface of the thick portion 54, the first substrate 52 and the second substrate 53 are more reliably bonded, and the flow paths 57 are partitioned and formed in a more reliably sealed state. As a result, liquid leaking and the like in the flow paths 57 is reduced. In the present embodiment, the thick portion 54 and the thin portion 55 are arranged along the first direction in the first substrate 52, and the first welding portions and the second welding portions are arranged along the first direction in the first substrate 52. In other words, since the direction in which the thick portion 54 and the thin portion 55 are lined up is aligned with the direction in which the first welding portions and the second welding portions (the bonding portions 56a to 56c) are lined up, the order in which the welding of the portions in which the sink marks S arise easily and the welding of the welding portions (the bonding portions 56) are to be performed becomes clear and the welding step becomes simple. It is easy to change the distance between the thick portion 54 and the first welding portions according to the distance between the thick portion 54 at which the sink marks S arise easily and the second welding portions. For example, as in the present embodiment, it is easy to shorten the distance between the second welding portions and the thick portion 54 to less than the distance between the first welding portions and the thick portion 54. Even in the present embodiment, in the first bonding portions 56a, the second bonding portions 56b, and the third bonding portion 56c, overhang portions 58a, 58b, and 58c which protrude to the flow path 57 side are formed, respectively. The magnitudes of overhang amounts w1, w2, and w3 of the overhang portions 58a, 58b, and 58c are w1<w2<w3. In other words, this indicates that the force which is applied during the welding increases in the order of the first bonding portions 56a, the second bonding portions 56b, and the third bonding portion 56c. Accordingly, the first substrate 52 and the second substrate 53 are more reliably welded at the third bonding portion 56c in which the sink marks S arise most easily. Since the gas flow paths are assigned to the flow paths 57b and 57c in which the overhang amounts are comparatively large, there is little concern of problems caused by the overhang portions 47 in comparison with the flow paths 57a and 57d for liquid in which there is a possibility that a problem will arise such as adherence of bubbles caused by the overhang portions 47. The other configurations are the same as those of the first embodiment.

Figure 18:
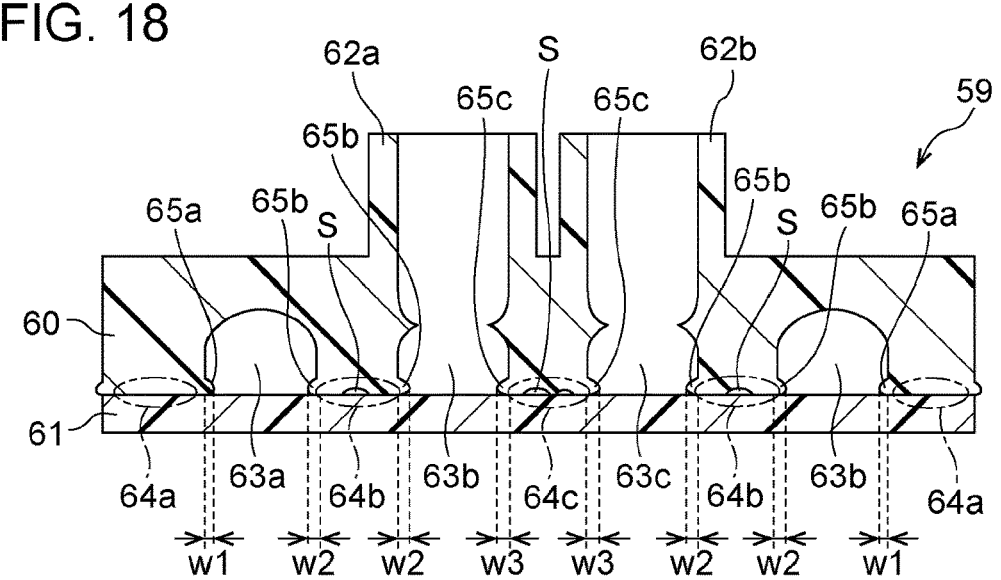
FIG. 18 is a sectional view of a flow path member in a third embodiment.

FIG. 18 is a sectional view illustrating the configuration of a flow path member 59 in the third embodiment. A first substrate 60 (a kind of the first member in the invention) in the present embodiment is thicker than a second substrate 61 overall and includes two joints 62a and 62b which protrude from one surface (the surface of the opposite side from the bonding surface of the second substrate 61) and are lined up in the first direction. The joints 62a and 62b communicate with a second flow path 63b and a third flow path 63c, respectively, among flow paths 63a to 63d which are defined by the first substrate 60 and the second substrate 61. The flow paths 63a to 63d are formed in the inner portion of the flow path member 59 due to the first substrate 60 and the second substrate 61 being bonded by bonding portions 64. In this manner, in the present embodiment, with respect to the distance from the center of the two joints 62, first bonding portions 64a are the furthest, a third bonding portion 64c is the closest, and second bonding portions 64b are an intermediate distance. In the present embodiment, the first flow path 63a and the fourth flow path 63d are used as flow paths for the liquid, and the second flow path 63b and the third flow path 63c are used as flow paths for the gas. The first flow path 63a and the fourth flow path 63d are defined by the first bonding portions 64a which are positioned closest to the outside in the direction in which the flow paths 63 are lined up (the first direction) and the second bonding portions 64b which are positioned one closer to the inside (the center portion side), and the second flow path 63b and the third flow path 63c are defined by the second bonding portions 64b and the third bonding portion 64c.

In the present embodiment, the sink marks S arise easily in the third bonding portion 64c which is in the vicinity of the joints 62. Therefore, when bonding the first substrate 60 to the second substrate 61, in the same manner as in the first embodiment (or the modification example), first, welding is performed using a laser or ultrasonic waves on the first bonding portions 64a which are present at positions furthest from the joints 62, next, welding is performed on the second bonding portions 64b, and finally, welding is performed on the third bonding portion 64c. Even in the present embodiment, since the pressure which is applied to the second bonding portions at the beginning of the second step (the welding step of the second bonding portions 64b (the second welding portions) after the welding step (the first step) of the first bonding portions 64a (the first welding portions) or the welding step of the third bonding portion 64c after the welding step (the first step) of the second bonding portions 64b (the first welding portions)) is greater than the pressure which is applied to the first welding portions and the second welding portions at the beginning of the first step in accordance with the melting of the resin portion of the first welding portions in the first step, even in a case in which the sink marks S arise in the second bonding portions 64b which are in the vicinity of the joints 62, the first substrate 60 and the second substrate 61 are more reliably bonded, and the flow paths 63 are partitioned and formed in a more reliably sealed state. As a result, liquid leaking and the like in the flow paths 63 is reduced. In the present embodiment, the plurality of joints 62 and the portions which do not include the joints 62 are arranged along the first direction in the first substrate 60, and the first welding portions and the second welding portions are arranged along the first direction in the first substrate 60. In other words, since the direction in which the plurality of joints 62 and the portions which do not include the joints 62 are lined up is aligned with the direction in which the first welding portions and the second welding portions are lined up, the order in which the welding of the portions in which the sink marks S arise easily and the welding of the welding portions are to be performed becomes clear and the welding step becomes simple. It is easy to change the distance between the center of the joints 62 and the first welding portions according to the distance between the center of the plurality of joints 62 (that is, the portions at which the sink marks S arise easily) and the second welding portions. For example, as in the present embodiment, it is easy to shorten the distance between the second welding portions and the center of the joints 62 to less than the distance between the first welding portions and the center of the joints 62. Even in the present embodiment, in the first bonding portions 64a, the second bonding portions 64b, and the third bonding portion 64c, overhang portions 65a, 65b, and 65c which protrude to the flow path 63 side are formed, respectively. The magnitudes of the overhang amounts w1, w2, and w3 of the overhang portions 65a, 65b, and 65c are w1<w2<w3. In other words, this indicates that the force which is applied during the welding increases in the order of the first bonding portions 64a, the second bonding portions 64b, and the third bonding portion 64c. Accordingly, the first substrate 60 and the second substrate 61 are more reliably welded at the third bonding portion 64c in which the sink marks S arise most easily. Since the gas flow paths are assigned to the flow paths 63b and 63c in which the overhang amounts are comparatively large, there is little concern of problems caused by the overhang portions 65 in comparison with the flow paths 63a and 63d for liquid in which there is a possibility that a problem will arise such as adherence of bubbles caused by the overhang portions 65. The other configurations are the same as those of the first embodiment.

Figure 19:
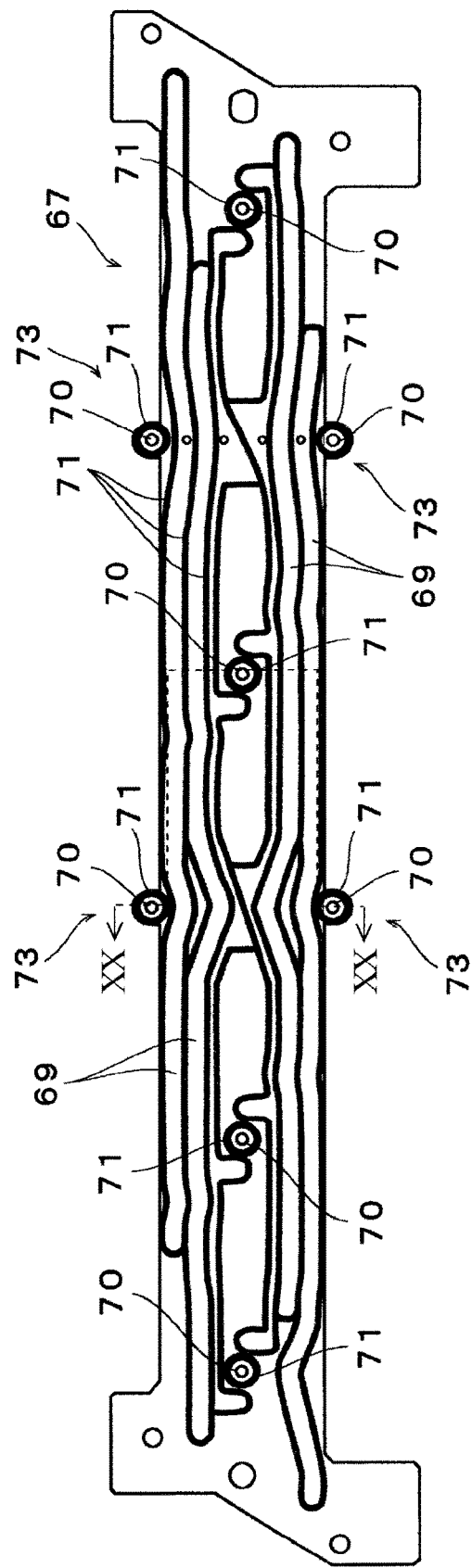
FIG. 19 is a plan view of a first substrate in a fourth embodiment.
Figure 20:
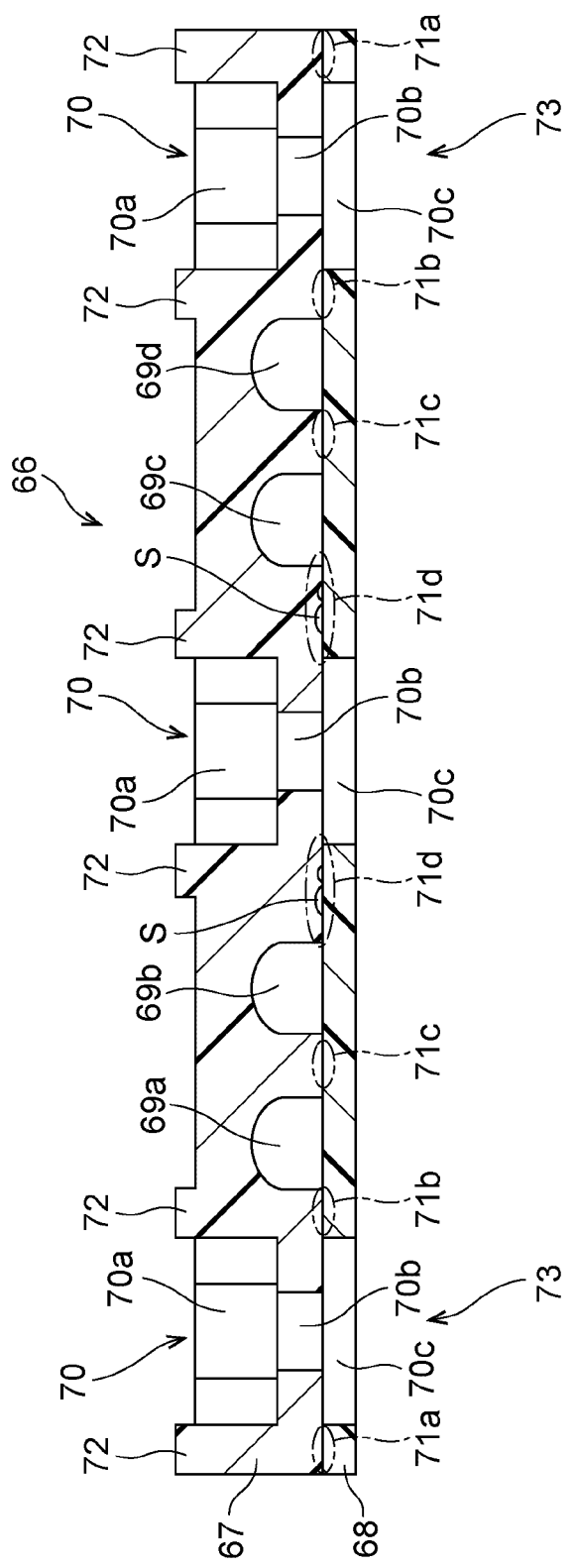
FIG. 20 is a sectional view taken along the line XX-XX in FIG. 19.

FIGS. 19 and 20 are views illustrating the configuration of the flow path member 66 in a fourth embodiment, FIG. 19 is a bottom view (bonding surface) of a first substrate 67, and FIG. 20 is a sectional view taken along the line XX-XX in FIG. 19. The flow path member 66 in the present embodiment is provided with a plurality of flow paths 69 in the same manner as the liquid flow paths 32 and the gas flow paths 33 of the flow path member 13 which is described above, and is also provided with nut housing portions 70 (a kind of housing portion in the invention) in which nuts (a kind of fixing member) relating to the fixing of the flow path member 66 are housed. The nut housing portions 70 include recessed portions 70a which follow the shape of the nuts (that is, hexagonal in plan view) and through holes 70b through which the shafts of bolts corresponding to the nuts are inserted, and is a portion in which the periphery is surrounded by partitioning walls 72. In the present embodiment, the nut housing portions 70 are formed in a total of four protruding portions 73, each of which protrudes from the edge portions of both sides in the direction (the first direction) in which the flow paths 69 are lined up in the first substrate 67 (a kind of the first member in the invention). A total of four of the nut housing portions 70 are formed leaving an interval in the longitudinal direction (the second direction) of the first substrate 67 even at positions which are on the center side of the direction in which the flow paths 69 are lined up in the first substrate 67 which is different in the second direction from the nut housing portions 70 of the protruding portions 73. The peripheral edge portions of the nut housing portions 70 in the bonding surface of the first substrate 67, that is, the bottom surfaces of the partitioning walls 72 are bonding portions 71 relating to the welding with a second substrate 68. In the present embodiment, the first flow path 69a and the fourth flow path 69d are used as flow paths for the liquid and are defined by first bonding portions 71a which are positioned closest to the outside in the direction in which the flow paths 69a to 69d and the nut housing portions 70 are lined up (the first direction) and second bonding portions 71b which are positioned one closer to the inside (the center portion side). A second flow path 69b and a third flow path 69c which are defined by third bonding portions 71c and fourth bonding portions 71d are used as flow paths for the gas.

Since a comparatively large force acts on the nut housing portions 70 when fixing the flow path member 66 to a fixing target using the nuts and bolts, a corresponding strength is demanded. Therefore, even in the nut housing portions 70, it is preferable for the first substrate 67 and the second substrate 68 (a kind of second member in the invention) to be more reliably welded during the bonding. Here, among the nut housing portions 70 in the first substrate 67, the sink marks S arise more easily in the vicinity of the nut housing portions 70 which are positioned close to the center side in the first direction than in the nut housing portions (the nut housing portions 70 which are formed in the protruding portions 73) which are positioned on the outside in the first direction. More specifically, in FIG. 20, the sink marks S arise easily in the fourth bonding portion 71d which are positioned at the peripheral edge portions of the nut housing portions 70 of the center portion. Therefore, even in the present embodiment, the welding step is performed in the order from the first bonding portions 71a of the peripheral edge portions of the nut housing portions 70 which are positioned closest to the outside in the direction (the first direction) in which the flow paths 69 are lined up to the second bonding portions 71b, the third bonding portions 71c, and the fourth bonding portions 71d. Accordingly, even in a case in which the sink marks S arise in the fourth bonding portions 71d in the peripheral edge portions of the nut housing portions 70, the peripheral edge portions of the nut housing portions 70 are more reliably welded and the flow paths 69 are partitioned and formed in a more reliably sealed state. As a result, it is possible to more reliably secure the necessary bonding strength for the nut housing portions 70. Since the bonding portions 71 between the flow paths 69 and the nut housing portions 70 are more reliably welded, for example, the liquid of the flow paths 69 leaking out to the nut housing portion 70 side and spreading to the outside of the flow path member 13 is reduced.

In the present embodiment, the nut housing portions 70 and the portions which do not include the nut housing portions 70 are arranged along the first direction in the first substrate 67, and the first welding portions and the second welding portions are arranged along the first direction in the first substrate 67. In other words, since the direction in which the nut housing portions 70 and the portions which do not include the nut housing portions 70 are lined up is aligned with the direction in which the first welding portions and the second welding portions are lined up, the order in which the welding of the portions in which the sink marks S arise easily and the welding of the welding portions are to be performed becomes clear and the welding step becomes simple. It is easy to change the distance between the nut housing portions 70 and the first welding portions according to the distance between the nut housing portions 70 at which the sink marks S arise easily and the second welding portions. For example, as in the present embodiment, it is easy to shorten the distance between the second welding portions and the nut housing portions 70 to less than the distance between the first welding portions and the nut housing portions 70. Even in the present embodiment, although not illustrated in the drawings, overhang portions are formed in the bonding portions 71, and the overhang amount of the overhang portions increases the closer to the nut housing portions 70 of the center portion. The other configurations are the same as those of the first embodiment.

Figure 21:
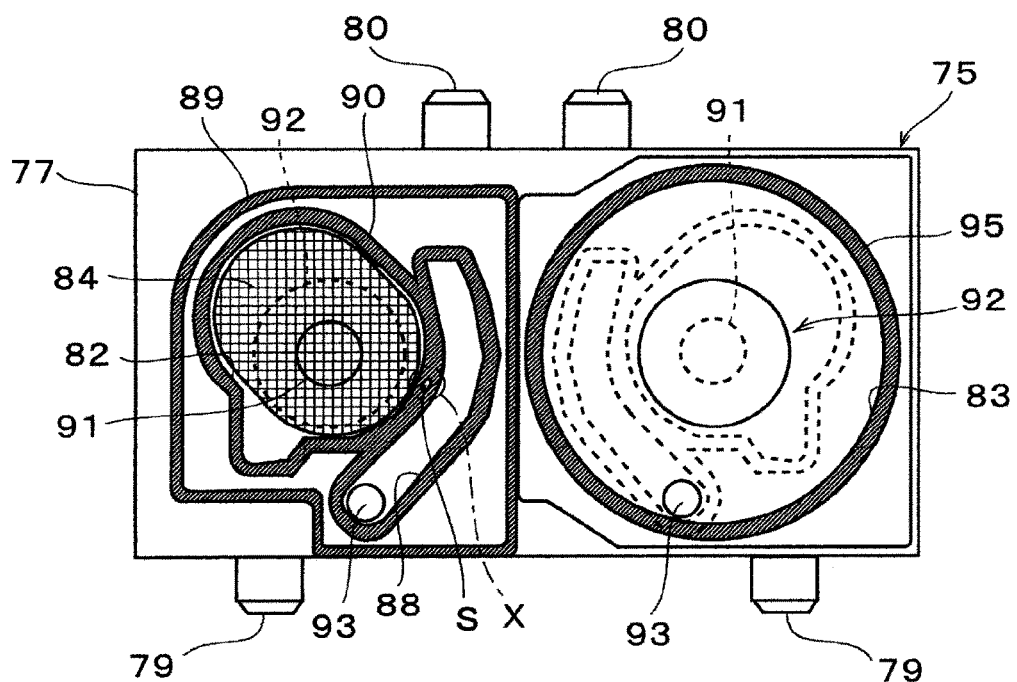
FIG. 21 is a side view of a pressure adjustment member in a fifth embodiment.
Figure 22:
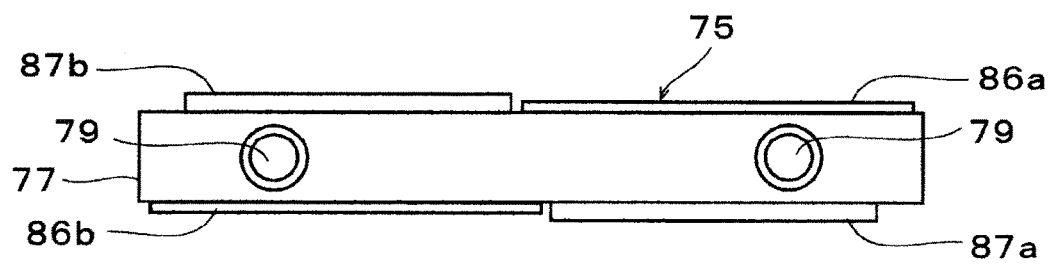
FIG. 22 is a top view of the pressure adjustment member in the fifth embodiment.
Figure 23:
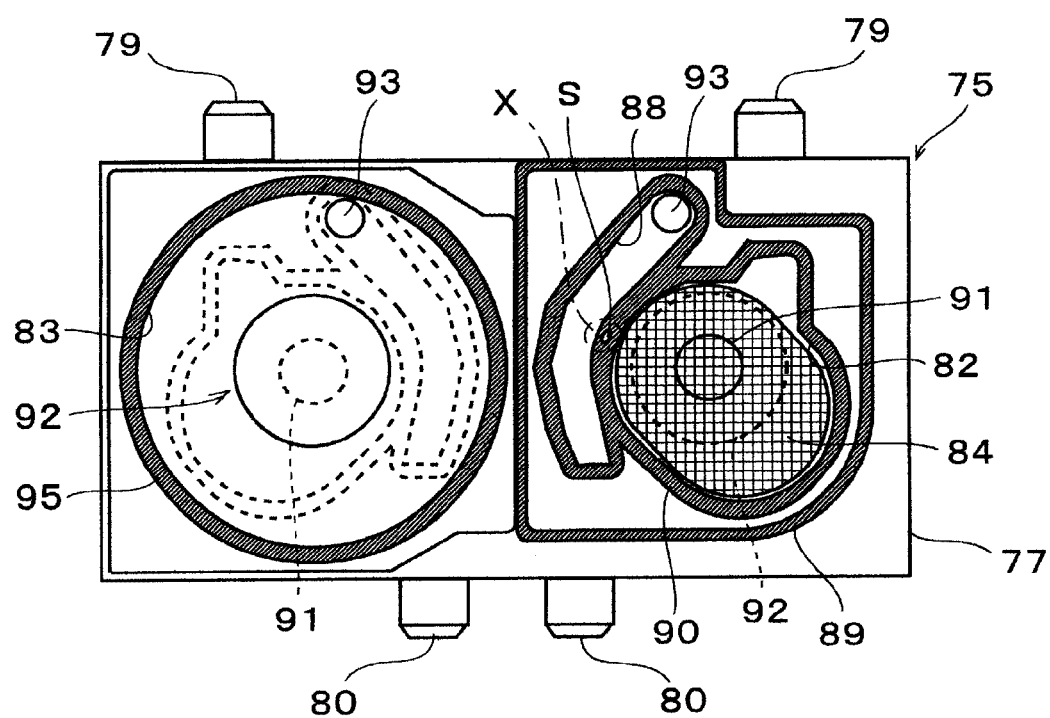
FIG. 23 is another side view of the pressure adjustment member in the fifth embodiment.

FIGS. 21 to 23 are views illustrating the configuration of the pressure adjustment member 75 (a kind of flow path member in the invention) in the fifth embodiment, FIG. 21 is a side view of a pressure adjustment member 75, FIG. 22 is a top view of the pressure adjustment member 75, and FIG. 23 is the other side view of the pressure adjustment member 75. The pressure adjustment member 75 is a member which adjusts the supply pressure of an ink which is supplied from an ink supply source such as an ink cartridge to the head unit and includes two systems of liquid flow path which are independent from each other. These liquid flow paths are flow paths which communicate liquid inflow ports 79 with liquid outflow ports 80 which are provided in a casing 77 and each includes a flow path chamber 82 and a pressure adjustment chamber 83 in the middle of the flow path.

The pressure adjustment member 75 in the present embodiment is a flow path member in which a flexible film 86a and a cap member 87a which correspond to the first flow path and a flexible film 86b and a cap member 87b which correspond to a second flow path are bonded to the casing 77. The casing 77 is formed using injection molding of a thermoplastic resin which has absorbency with respect to a laser beam in the same manner as the first substrate 30 in the first embodiment. The liquid inflow ports 79 are formed for each of the first flow path and the second flow path in the top surface of the casing 77, and the liquid outflow ports 80 are formed for each of the first flow path and the second flow path in the bottom surface of the casing 77.

The cap member 87a of the first flow path and the flexible film 86b of the second flow path are bonded to one side surface of the casing 77, and the flexible film 86a of the first flow path and the cap member 87b of the second flow path are bonded to the other side surface of the casing 77. The flexible film 86 is a thin material which has optical translucency and flexibility. The cap member 87 is a plate-shaped member which is made of a thermoplastic resin which has optical transparency in the same manner as the second substrate 31 in the first embodiment. The flexible film 86 and the cap member 87 are arranged to face each other interposing the casing 77. Hereinafter, since the configuration corresponding to the first flow path and the configuration corresponding to the second flow path are in a rotationally symmetrical relationship, description will be given of the configuration corresponding to one of the flow paths.

A recessed portion which serves as the flow path chamber 82, a groove portion which serves as an outlet flow path 88, a first fixing portion 89, and a second fixing portion 90 are formed in the region of the casing 77 which is covered by the cap member 87. The flow path chamber 82 and the outlet flow path 88 are portions which are more depressed than the side surface of the casing 77. The flow path chamber 82 communicates with the liquid inflow port 79 and an end portion of the bottom surface side of the casing 77 in the outlet flow path 88 communicates with the liquid outflow port 80. The first fixing portion 89 and the second fixing portion 90 are portions which protrude from the side surface of the casing 77. The first fixing portion 89 is a protrusion for welding which is formed in a ring shape so as to surround the flow path chamber 82 and the outlet flow path 88 to follow the external shape of the cap member 87. Similarly, the second fixing portion 90 is also a protrusion for welding and is formed along the opening peripheral edge of the first flow path chamber 82 and the opening peripheral edge of the outlet flow path 88 closer to the inside than the first fixing portion 89. The cap member 87 is bonded to the end surfaces of the fixing portions 89 and 90, and thus, the flow path chamber 82 and the outlet flow path 88 are formed by the cap member 87 and the recessed portion which is formed in the casing 77. For the bonding of the cap member 87 to the first fixing portion 89, laser welding is adopted in which the first fixing portion 89 is melted by the irradiation of the laser beam L and the cap member 87 is bonded, as described later.

A filter 84 which filters the ink flowing in the liquid flow path and collects bubbles and foreign matter is installed on the inside of the flow path chamber 82. The filter 84 is disposed in a depressed portion closer to the opposite side surface of the casing 77 than the end surface of the second fixing portion 90 of the periphery of the flow path chamber 82. Therefore, a gap through which the ink can pass is provided between the cap member 87 and the filter 84 which are bonded to the second fixing portion 90. A communicating port 91 which communicates the flow path chamber 82 with the pressure adjustment chamber 83 of the opposite side surface is provided in the bottom surface of the flow path chamber 82.

The pressure adjustment chamber 83 which is formed in the opposite side surface from the flow path chamber 82 is a space which is formed between the flow path chamber 82 and the outlet flow path 88 and is formed by a recessed portion which is depressed from the side surface of the casing 77 and is circular in plan view being blocked by the flexible film 86. A third fixing portion 95 which is formed in a ring shape along the opening peripheral edge of the recessed portion which serves as the pressure adjustment chamber 83 is provided in the region which is covered by the flexible film 86. The flexible film 86 is welded to the end surface of the third fixing portion 95 by a laser or ultrasonic waves. A pressure adjustment mechanism 92 is installed between the pressure adjustment chamber 83 and the flow path chamber 82. The pressure adjustment mechanism 92 is a valve mechanism which switches between allowing the ink to flow from the flow path chamber 82 to the pressure adjustment chamber 83 through the communicating port 91 and blocking the ink as the flexible film 86 deforms according to the pressure (the negative pressure) inside the pressure adjustment chamber 83. When the pressure adjustment mechanism 92 allows the flowing of the ink from the flow path chamber 82 to the pressure adjustment mechanism 92 through the communicating port 91 by opening the communicating port 91, the ink which flows in the pressure adjustment chamber 83 flows from an outlet 93 into the outlet flow path 88 and is supplied to the head unit side from the liquid outflow port 80 which communicates with the outlet flow path 88. In other words, two systems of liquid flow path are formed in the pressure adjustment member 75 which cause the ink to flow in a path of the liquid inflow port 79, the flow path chamber 82, the outlet flow path 88, the communicating port 91, the pressure adjustment chamber 83, the outlet 93, the outlet flow path 88, and the liquid outflow port 80.

Even when molding the casing 77 in the configuration which is described above, the sink marks S in which the surface is partially depressed may arise in the same manner as in the first substrate 30 in the first embodiment. More specifically, in FIG. 21 or 23, the sink marks S arise easily in the portion which is indicated by X in the second fixing portion 90. Since the second fixing portion 90 is an important portion relating to the liquid-tightness of the flow path chamber 82 and the outlet flow path 88, it is necessary to more reliably bond the casing 77 to the cap member 87 at the second fixing portion 90. In the present embodiment, when bonding the casing 77 to the cap member 87, in the same manner as in the first embodiment (or the modification example), first welding is performed on the first fixing portion 89 (a kind of the first welding portion in the invention) which is in a position that is further from the sink mark arising portion X using a laser or ultrasonic waves (the first step), and subsequently, welding is performed on the second fixing portion 90 (a kind of the second welding portion in the invention) (the second step). Even in this case, since the pressure which is applied to the second fixing portion 90 at the beginning of the second step is greater than the pressure which is applied to the first fixing portion 89 and the second fixing portion 90 at the beginning of the first step in accordance with the melting of the resin portion of the first fixing portion 89 in the first step, even in a case in which the sink marks S arise in the second fixing portion 90, the flow path chamber 82 and the outlet flow path 88 are partitioned and formed in a more reliably sealed state. As a result, liquid leaking in the flow path chamber 82 the outlet flow path 88 is reduced. In the present embodiment, due to the first fixing portion 89 being provided, even in an unlikely case in which liquid leaking occurs from the flow path chamber 82 or the outlet flow path 88, the ink which is leaked out is prevented from leaking out to the outside by the first fixing portion 89. In a case in which there is no concern of liquid leaking from the flow path chamber 82 or the outlet flow path 88 occurring, with respect to the first fixing portion 89, since the first fixing portion 89 may have a function for ensuring that the bond with at least the second fixing portion 90 is reliable, the first fixing portion 89 does not necessarily have to be closed in a ring shape.

Hereinabove, description is given exemplifying the ink jet recording head 3 (the recording head 3) which is a kind of liquid discharging head; however, the invention may be applied to other liquid discharging heads as long as a flow path member which is formed by bonding a first member and a second member using welding is provided. For example, it is possible to apply the invention to a color material discharging head which is used in the manufacture of a color filter of a liquid crystal display or the like, an electrode material discharging head which is used in forming electrodes of an organic electroluminescence (EL) display, a face emission display (FED), and the like, a liquid discharging head which is provided with a plurality of bio-organic matter discharging heads used in the manufacture of bio-chips (biochemical elements), and liquid discharging apparatuses which are provided with these.

CROSS REFERENCES TO RELATED APPLICATIONS

This application claims priority to Japanese Patent Application No. 2016-183927 filed on Sep. 21, 2016. The entire disclosures of Japanese Patent Application No. 2016-183927 are hereby incorporated herein by reference.

What is claimed is:

1. A manufacturing method of a flow path member which includes a flow path between a first member and a second member which are stacked together, the method comprising:
   a first step of welding the first member and the second member to each other at a first welding portion in a state in which pressure is applied in a stacking direction to the first member and the second member which are stacked to be in contact with each other; and
   a second step of welding the first member and the second member to each other at a second welding portion of a different position from the first welding portion in a state in which a pressure is applied in the stacking direction to the first member and the second member,
   wherein in the second step, the pressure which is applied to the second welding portion is greater than the pressure which is applied to the second welding portion in the first step, and
   wherein in the first step, the pressure which is applied to the second welding portion increases as the pressure which is applied to the first welding portion decreases in a state in which a shape of a main body of the first member and a shape of a main body of the second member are maintained.

2. The manufacturing method of a flow path member according to claim 1,
   wherein in the first step, by welding the first member and the second member at the first welding portion, at least one of the first member or the second member is set to a warped state, and
   wherein in the second step, by welding the first member and the second member at the second welding portion, the warping of the one is reduced.

3. The manufacturing method of a flow path member according to claim 1,
   wherein the first member includes a thick portion and a thin portion, and
   wherein a distance between the second welding portion and the thick portion is shorter than a distance between the first welding portion and the thick portion.

4. The manufacturing method of a flow path member according to claim 3,
   wherein the thick portion and the thin portion are arranged along a first direction in the first member, and
   wherein the first welding portion and the second welding portion are arranged along the first direction in the first member.

5. The manufacturing method of a flow path member according to claim 1,
   wherein the first member includes a joint which communicates with the flow path in a state in which the joint protrudes from one surface of the first member, and
   wherein the second welding portion is closer to the joint than the first welding portion.

6. The manufacturing method of a flow path member according to claim 5,
   wherein a plurality of the joints are arranged along a first direction in the first member, and
   wherein the first welding portion and the second welding portion are arranged along the first direction in the first member.

7. The manufacturing method of a flow path member according to claim 1,
   wherein a plurality of the first welding portions are provided at positions interposing the second welding portion therebetween.

8. The manufacturing method of a flow path member according to claim 1, further comprising:
   a housing portion which houses a fixing member relating to fixing of the flow path member,
   wherein the second welding portion is closer to the housing portion than the first welding portion.

9. The manufacturing method of a flow path member according to claim 8,
   wherein the housing portion and a portion which does not include the housing portion are arranged along a first direction in the first member, and
   wherein the first welding portion and the second welding portion are arranged along the first direction in the first member.

10. The manufacturing method of a flow path member according to claim 1,
    wherein the first welding portion is formed to surround a periphery of the second welding portion.

11. The manufacturing method of a flow path member according to claim 1,
    wherein, in a stacking direction of the first member and the second member, a thickness of a portion which defines the flow path extending along a plane that is perpendicular to the stacking direction in the second member is thinner than a thickness of a portion which defines the flow path extending along to the plane of the first member.

* * * * *